US012603959B2

(12) United States Patent
Kim et al.

(10) Patent No.:　US 12,603,959 B2
(45) Date of Patent:　Apr. 14, 2026

(54) METHOD AND ELECTRONIC DEVICE FOR REMOVING ECHO FLOWING IN DUE TO EXTERNAL DEVICE

(71) Applicant: Samsung Electronics Co., Ltd., Suwon-si (KR)

(72) Inventors: Seunghyun Kim, Suwon-si (KR); Baekgyeong Kim, Suwon-si (KR); Gangyoul Kim, Suwon-si (KR); Misun Kim, Suwon-si (KR); Sangheon Kim, Suwon-si (KR); Mira Seo, Suwon-si (KR); Kwangyong Choi, Suwon-si (KR); Dongyoon Park, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 18/349,374

(22) Filed: Jul. 10, 2023

(65) Prior Publication Data

US 2023/0353684 A1　Nov. 2, 2023

Related U.S. Application Data

(63) Continuation of application No. PCT/KR2022/000410, filed on Jan. 11, 2022.

(30) Foreign Application Priority Data

Jan. 13, 2021　(KR) ........................ 10-2021-0004818

(51) Int. Cl.
*H04M 9/08*　(2006.01)
*G06F 3/14*　(2006.01)
*H04M 9/10*　(2006.01)

(52) U.S. Cl.
CPC .......... *H04M 9/082* (2013.01); *G06F 3/1454* (2013.01); *H04M 9/10* (2013.01)

(58) Field of Classification Search
CPC ....... H04M 9/082; H04M 9/10; G06F 3/1454; H04R 2430/20; H04R 1/406; H04R 3/02;
(Continued)

(56) References Cited

U.S. PATENT DOCUMENTS 9,462,115 B2 * 10/2016 Rand ...................... H04M 1/656
9,680,999 B2 　 6/2017 Jang
(Continued)

FOREIGN PATENT DOCUMENTS

JP　　　　 5204378 B2　　 2/2013
JP　　 2020171006 A　 10/2020
(Continued)

OTHER PUBLICATIONS

International Search Report for PCT/KR2022/000410 mailed Apr. 21, 2022, 4 pages.
(Continued)

*Primary Examiner* — Lisa Hashem
(74) *Attorney, Agent, or Firm* — NIXON & VANDERHYE P.C.

(57) ABSTRACT

An electronic device according to various embodiments comprises a communication module including communication circuitry, at least one microphone, and a processor. The processor can be configured to: be connected to an external device through the communication module; switch a call audio signal path to an external device output path in response to being call-connected to an opponent device; duplicate a call audio signal (Rx in) transmitted from the opponent device, provide a first signal to an echo removal module, and provide a second signal to the external device via the external device output path; measure latency between
(Continued)

the external device and the electronic device; variably adjust the size of a dynamic buffer for removing echo, by applying the measured latency; generate a reference signal delayed in the second signal, by the adjusted dynamic buffer; and remove an echo signal, with respect to the first signal generated from a speaker of the external device, from a microphone input signal obtained from the at least one microphone, based on the generated reference signal.

13 Claims, 20 Drawing Sheets

(58) Field of Classification Search
    CPC ...... H04R 3/005; H04R 2499/11; G09G 5/12; G09G 2340/145; G09G 2354/00
    See application file for complete search history.

(56) References Cited

U.S. PATENT DOCUMENTS

| | | | | |
|---|---|---|---|---|
| 9,947,338 | B1 * | 4/2018 | Koteshwara | H04R 5/02 |
| 10,684,972 | B2 * | 6/2020 | Renard | G06F 21/606 |
| 10,771,633 | B2 * | 9/2020 | Qiao | H04M 9/08 |
| 10,999,444 | B2 | 5/2021 | Yuzuriha | |
| 11,303,757 | B2 * | 4/2022 | Serbajlo | H04L 12/1831 |
| 12,255,942 | B2 * | 3/2025 | Gidley | H04L 65/80 |
| 2004/0073692 | A1 * | 4/2004 | Gentle | H04L 47/283 |
| | | | | 709/231 |
| 2012/0287769 | A1 * | 11/2012 | Saleem | H04M 9/082 |
| | | | | 370/201 |
| 2013/0016820 | A1 * | 1/2013 | Takayama | H04B 3/23 |
| | | | | 379/406.01 |
| 2013/0147901 | A1 * | 6/2013 | Weiser | H04L 65/1069 |
| | | | | 348/E7.083 |
| 2013/0212228 | A1 * | 8/2013 | Butler | G06T 13/40 |
| | | | | 709/219 |
| 2013/0278484 | A1 | 10/2013 | Hwang et al. | |
| 2014/0003611 | A1 * | 1/2014 | Mohammad | H04B 3/20 |
| | | | | 381/66 |
| 2017/0235461 | A1 | 8/2017 | Oh et al. | |
| 2019/0124206 | A1 | 4/2019 | Qiao et al. | |
| 2019/0281162 | A1 | 9/2019 | Liang | |
| 2021/0051404 | A1 | 2/2021 | Li et al. | |
| 2022/0005490 | A1 | 1/2022 | Jin et al. | |
| 2023/0353684 | A1 * | 11/2023 | Kim | H04M 9/10 |
| 2025/0088797 | A1 * | 3/2025 | Soto | H04R 3/005 |

FOREIGN PATENT DOCUMENTS

| | | |
|---|---|---|
| KR | 20000020903 A | 4/2000 |
| KR | 20060116499 A | 11/2006 |
| KR | 20130084793 A | 7/2013 |
| KR | 101583715 B1 | 1/2016 |
| KR | 20170011763 A | 2/2017 |
| KR | 20170095690 A | 8/2017 |
| KR | 20200043128 A | 4/2020 |
| KR | 102109608 B1 | 5/2020 |
| KR | 20200070346 A | 6/2020 |

OTHER PUBLICATIONS

Written Opinion of the ISA for PCT/KR2022/000410 mailed Apr. 21, 2022, 4 pages.
Extended European Search Report dated Apr. 18, 2024 issued in European Patent Application No. 22739611.6.

* cited by examiner

Figure 4:
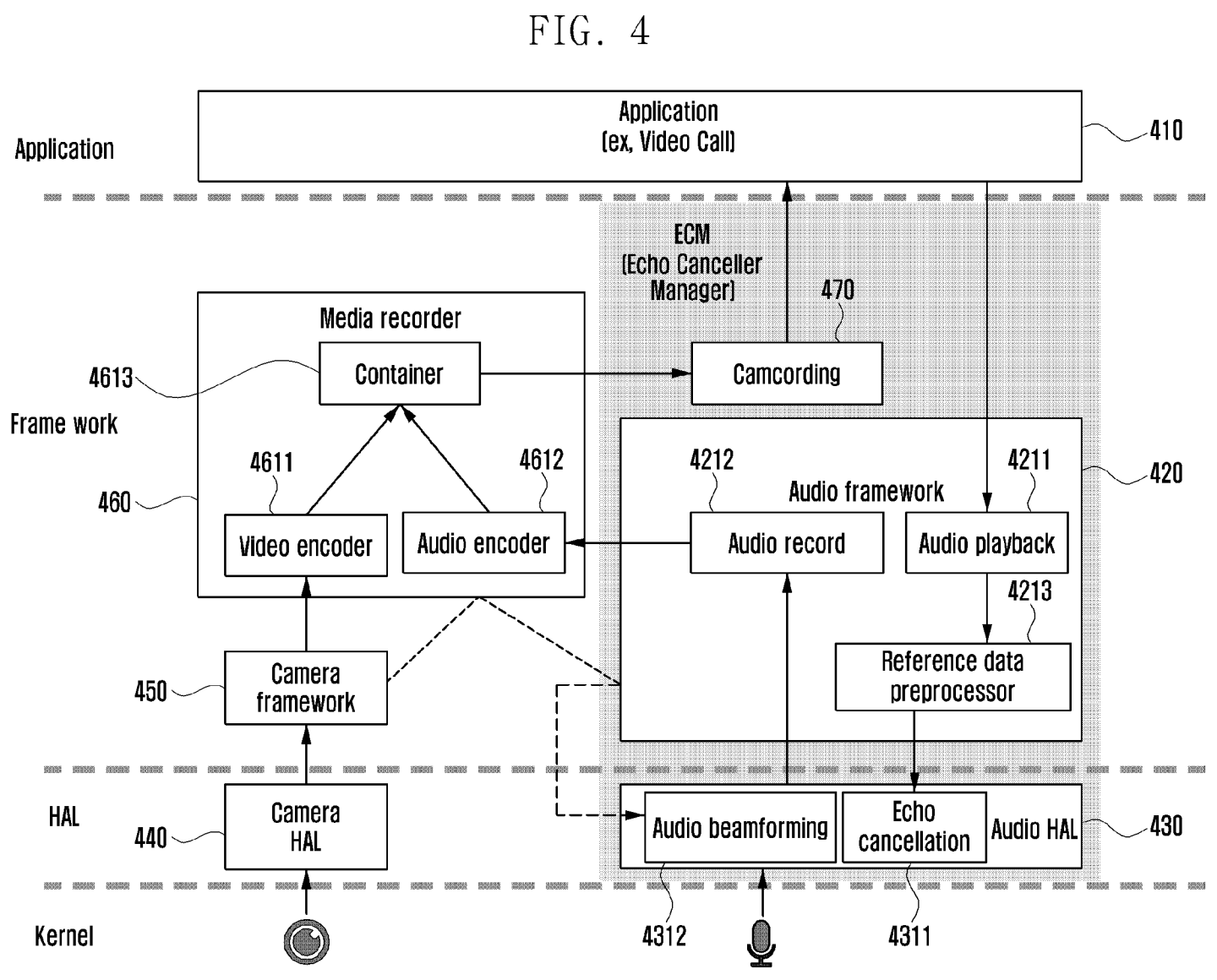

Application
(ex, Video Call)

Application

ECM
(Echo Canceller
Manager)

470

Camcording

Audio framework

4211

Audio playback

4213

Reference data
preprocessor

4212

Audio record

Audio HAL

Echo
cancellation

4311

Audio beamforming

4312

Media recorder

Container

4613

Audio encoder

4612

Video encoder

4611

460

Frame work

Camera
framework

450

Camera
HAL

440

HAL

Kernel

METHOD AND ELECTRONIC DEVICE FOR REMOVING ECHO FLOWING IN DUE TO EXTERNAL DEVICE

CROSS-REFERENCE TO RELATED APPLICATIONS

This application is a continuation of International Application No. PCT/KR2022/000410 designating the United States, filed on Jan. 11, 2022, in the Korean Intellectual Property Receiving Office and claiming priority to Korean Patent Application No. 10-2021-0004818, filed on Jan. 13, 2021, in the Korean Intellectual Property Office, the disclosures of which are incorporated by reference herein in their entireties.

BACKGROUND

Field

The disclosure relates to a method and an electronic device for removing echo flowing therein by an external device.

Description of Related Art

Recently, various contactless video call platforms are proposed for communication. For example, an electronic device (for example, a portable terminal or a smartphone) may establish a connection to an external device (for example, a large-screen device or a television (TV)) and make a call connection (for example, voice or video) by interworking with the external device through screen sharing (for example, screen mirroring).

When an electronic device interworks with an external device and makes a connection with a counterpart, a sound output from a speaker of the external device flows into a microphone of the electronic device and thus an echo problem may occur. In voice communication, a voice signal is distorted by noise or echo, and thus cancellation of background noise or echo from an input signal received from a microphone may be an important factor to improve sound quality.

Meanwhile, when the electronic device is connected to the external device through a network and makes a call connection, delay on a call audio path may vary depending on a network environment and a reference signal (in other words, reference data) for echo cancellation cannot be secured due to the change in the audio output path. Accordingly, the electronic device has difficulty in cancelling an echo signal caused by sound from the speaker of the external device, thereby deteriorating audio quality of a call.

SUMMARY

Embodiments of the disclosure may provide a scheme of effectively removing echo flowing into the electronic device by the external device when a call connection is made in an environment in which the electronic device and the external device are connected through the network.

An electronic device according to various example embodiments comprises: a communication module comprising communication circuitry, at least one microphone, and a processor. The processor can be configured to: be connected to an external device via the communication module; switch a call audio signal path to an external device output path in response to being call-connected to an opponent device;

duplicate a call audio signal (Rx in) transmitted from the opponent device, provide a first signal to an echo removal module comprising echo removal circuitry, and provide a second signal to the external device via the external device output path; measure latency between the external device and the electronic device; variably adjust a size of a dynamic buffer for removing echo, by applying the measured latency; generate a reference signal delayed in the second signal, by the adjusted dynamic buffer; and remove an echo signal, with respect to the first signal generated from a speaker of the external device, from a microphone input signal obtained from the at least one microphone, based on the generated reference signal.

A method of cancelling echo flowing into an electronic device by an external device according to various example embodiments comprises making a connection with an external device through a screen sharing function and switching a call audio signal path to an external device output path in response to a call connection with a counterpart device, copying a call audio signal transferred to the counterpart device, providing a first signal to an echo cancellation module, and providing a second signal to the external device through the external device output path, measuring latency between the external device and the electronic device, reflecting the measured latency to adjust a size of a dynamic buffer for each cancellation processing, generating a reference signal delayed from the first signal using the adjusted dynamic buffer, and cancelling an echo signal for the second signal generated by a speaker of the external device from a microphone input signal acquired from at least one microphone, based on the generated reference signal.

According to various example embodiments, when an electronic device interworks with an external device and makes a call connection with a counterpart device, it is possible to transfer a user voice to the counterpart device while maintaining call quality by measuring latency (in other words, a delay degree) changed between the electronic device and the external device, generating a delayed reference signal through dynamic buffering, and cancelling an echo signal flowing into by the external device.

According to various example embodiments, the electronic device can provide an environment of a call connection with a counterpart with improved voice quality to a user even though the electronic device interworks with an external device having a large screen.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a diagram illustrating an example system hierarchical structure of the electronic device according to various embodiments;

FIGS. 11A, 11B, 11C and 11D are diagrams illustrating an example operation of generating a dynamically buffered reference signal according to various embodiments;

FIG. 14 is a diagram illustrating example configurations of the echo cancellation operation of the electronic device according to various embodiments;

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
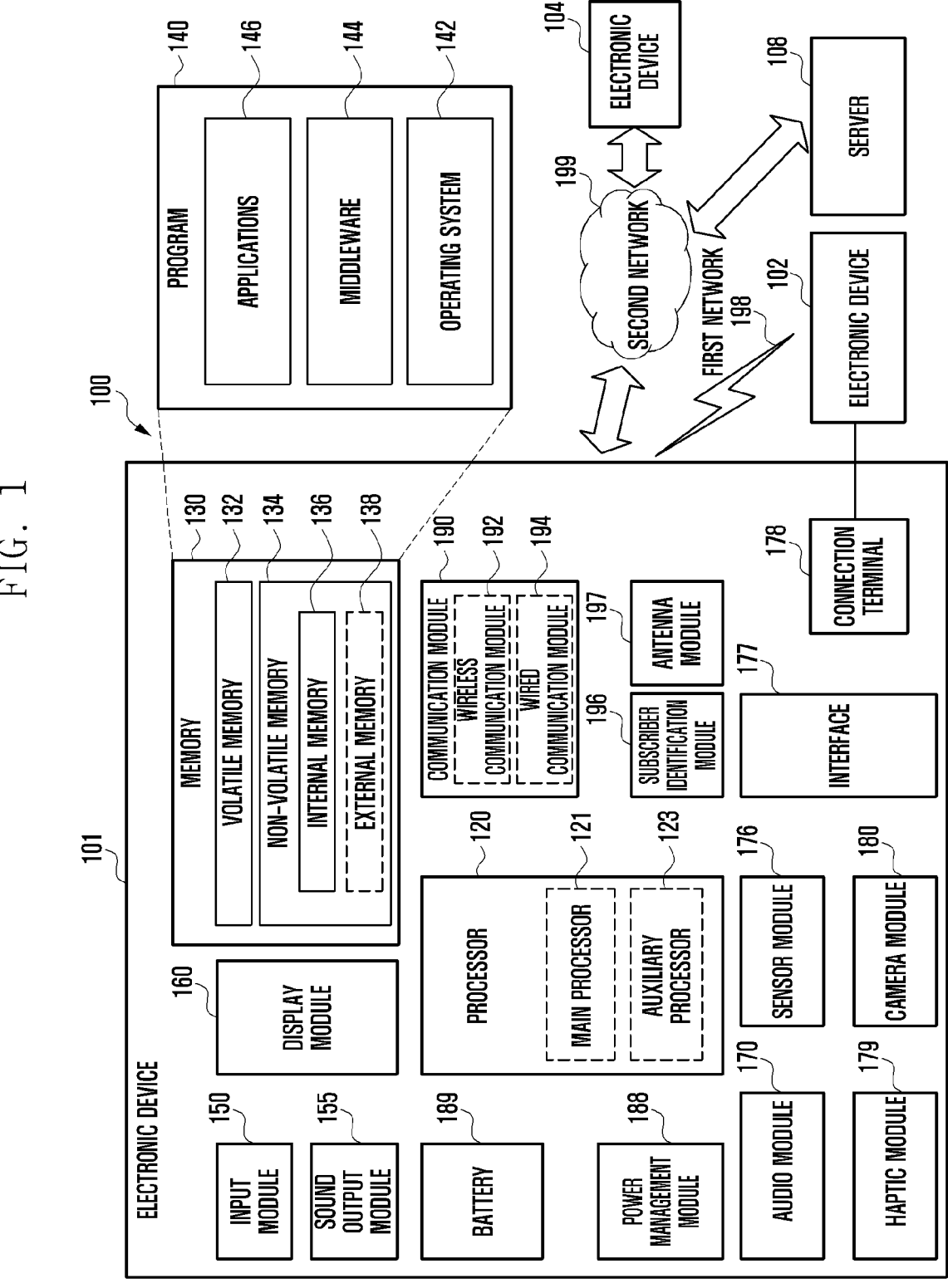
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196).

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface: (SPI), or mobile industry processor interface (MIPI).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
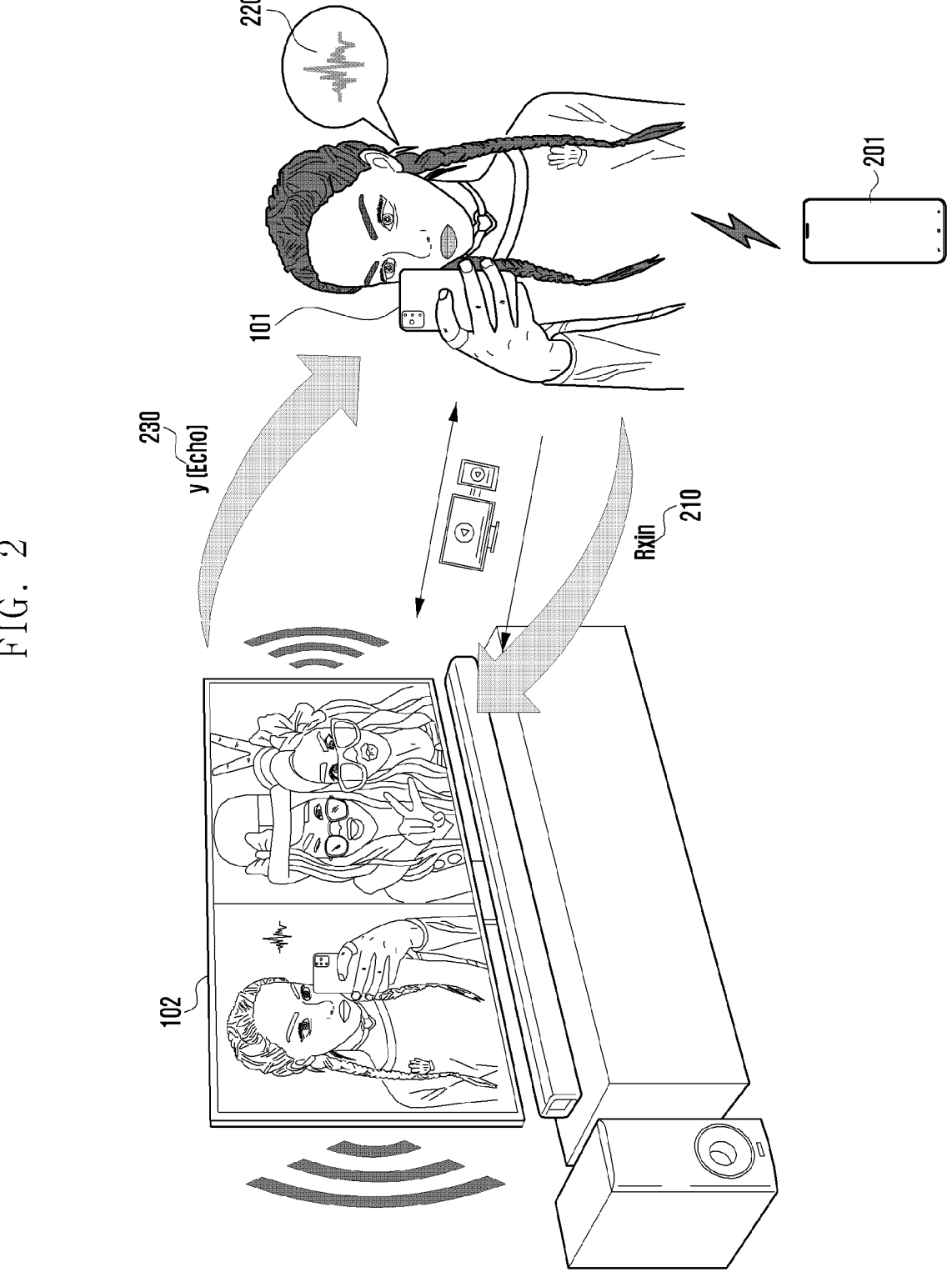
FIG. 2 is a diagram illustrating an example situation in which an electronic device interworks with an external device and makes a video call with a counterpart device according to various embodiments.

FIG. 2 is a diagram illustrating an example situation in which an electronic device interworks with an external device and makes a video call with a counterpart device according to various embodiments.

In an example of FIG. 2, the electronic device 101 may be implemented as a portable terminal such as a smartphone or a tablet PC, and the external device 102 may be implemented as a large-screen electronic device such as a desktop PC, a laptop, or a television, but the disclosure is not limited thereto.

The electronic device 101 may make a video call with a counterpart device 201 in a state in which the electronic device is connected to the external device 102 (for example, a large-screen device or a television (TV)) through a network. For example, the electronic device 101 and the external device 102 may be connected to each other through short-range wireless communication but is not limited thereto and may be connected through wired communication (for example, a cable connection or a USB connection).

The electronic device 101 may perform a screen sharing function (For example, a screen mirroring function or a smart view function) through which an image can be displayed in the external device 102 and transmit video call information 210 (for example, reception data (Rx input)) received from the counterpart device 201 to the external device 102.

The external device 102 may output a counterpart voice to a speaker of the external device 102 while outputting a counterpart image transmitted from the electronic device 101 to a display.

A microphone of the electronic device 101 may be in an activated state to acquire the user voice 220 in response to the connection of the video call with the counterpart device. At this time, a problem of echo (y(echo)) 230 may occur since the counterpart voice output from the speaker of the external device 102 flows into the microphone of the electronic device 101.

The electronic device 101 according to various embodiments may cancel a speaker sound of the external device 102 (that is, the echo signal (y) 230) flowing therein together with the user voice 220 during the video call with the counterpart device through interworking with the external device 102. Hereinafter, various schemes in which the electronic device 101 cancels the echo signal 230 flowing therein by the external device 102 will be described.

Figure 3:
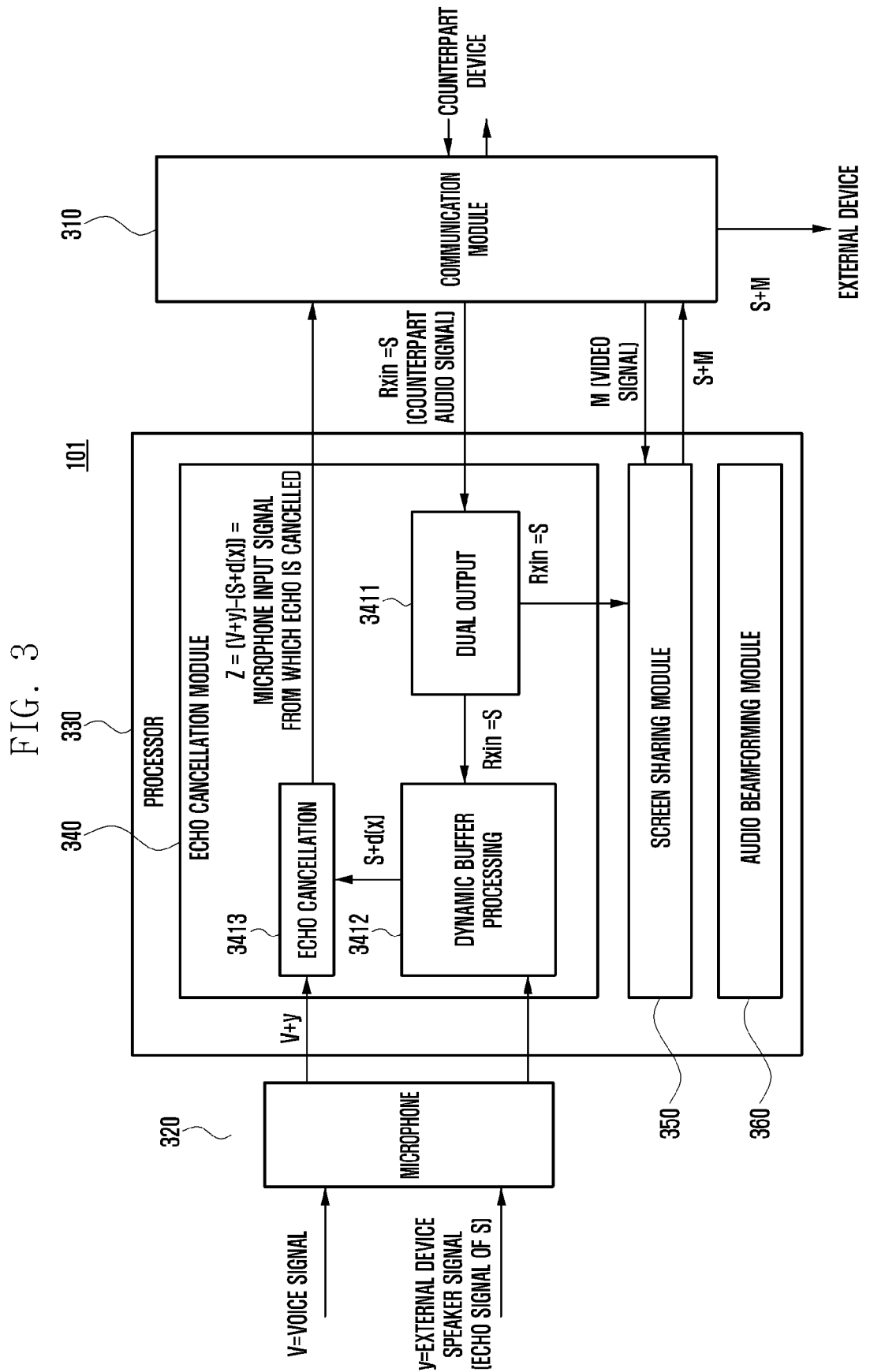
FIG. 3 is a block diagram illustrating an example configuration of the electronic device according to various embodiments.

FIG. 3 is a block diagram illustrating an example configuration of the electronic device according to various embodiments.

Referring to FIG. 3, the electronic device 101 according to an embodiment may include a communication module (e.g., including communication circuitry) 310, a processor (e.g., including processing circuitry) 330, and a microphone 320. The electronic device 101 may further include at least some of the configurations and/or functions of the electronic device 101 of FIG. 1 or may include the elements which overlap those in FIG. 1.

The communication module 310 may include various communication circuitry and wirelessly communicate with a counterpart device (for example, the counterpart device 201 of FIG. 2). For example, the communication module 310 may transmit and receive at least one of an audio signal and a video signal to and from the counterpart device. For example, the communication module 310 may receive reception data (for example, an audio signal (S: Rx input) and a video signal (M)) received from the counterpart device and transfer the same to the processor 330.

The communication module 310 may be connected to an external device (for example, the external device 102 of FIG. 2) through wireless or wired communication. The communication module 310 may transfer the reception data (for example, the audio signal (Rx input) and the video signal (M)) of the counterpart device to the external device through a screen sharing module 350 (for example, a screen mirroring module) by the control of the processor 330.

According to an embodiment, the communication module 310 may provide the audio signal (S) of the counterpart device to an echo cancellation module 340 to process a reference signal by the control of the processor 330.

The microphone 320 may include at least one or a plurality of microphone arrays. The microphone 320 may receive a sound signal (hereinafter, referred to as a microphone input signal) corresponding to a sound acquired from the outside.

The microphone 320 may be activated in response to the call connection with the counterpart device. The microphone 320 may receive an input of a voice signal (V) spoken by the user.

For example, when the call connection is made in the state in which the electronic device 101 is connected to the external device through the network, a speaker signal (y) of the external device (in other words, the echo signal (y) based on the counterpart audio signal (S)) may flow into.

The microphone 320 may transfer the sound signal (for example, voice signal (V)+speaker signal (y) of the external device) acquired from the outside to the processor (or the echo cancellation module 340).

According to various embodiments, when the electronic device 101 may be implemented as a microphone array, the electronic device 101 may acquire a microphone input signal of multiple channels through each microphone. The electronic device 101 may adjust a gain or delay of each microphone 320 through an audio beamforming module 360 and thus a sound in a direction in which the speaker is located may be beamformed (in other words, a sound of the microphone in the speaker direction is amplified) and received.

The processor 330 (for example, the processor 120 of FIG. 1) may include various processing circuitry and control the overall operation of the electronic device 101 and the signal flow between the elements within the electronic device 101 and process data. Although not illustrated in drawings, the electronic device 101 may further include a memory (not shown), and the memory may store various instructions which can be executed by the processor 330.

Hereinafter, an operation in which the processor 330 transmits reception data of the counterpart device to the external device when the call connection with the counterpart device is made and an operation in which the processor 330 removes an echo signal generated by the external device are described in detail, and operations of the processor 330 described below may be performed by loading the instructions stored in the memory.

According to an embodiment, the processor 330 may perform control to transmit reception data of the counterpart device to the external device in response to the call connection of the electronic device 101 with the counterpart device through interworking with the external device. The processor 330 may copy a voice signal (Rx in) received from the counterpart device and perform control to output a first signal to remove echo and output a second signal to transmit the same to the external device (for example, dual output). The processor 330 may perform control to dynamically measure (or calculate or estimate) latency (in other words, a delay degree) between the electronic device 101 and the external device and variably adjust the size of a dynamic buffer according to the measured latency. The processor 330 may perform control to buffer and delay a reference signal (in other words, reference data) for removing echo by the dynamic buffer, apply the delayed reference signal, and remove the echo signal (y) from the microphone input signal (V and y). The processor 330 may perform an operation of transmitting a microphone input signal (Z) from which echo is removed to the counterpart device.

According to an embodiment, the processor 330 may include an echo cancellation module (e.g., including various processing circuitry and/or executable program instructions) 340, a screen sharing module (e.g., including various processing circuitry and/or executable program instructions) 350, and an audio beamforming module (e.g., including various processing circuitry and/or executable program instructions) 360. The processor 330 may control operations of the echo cancellation module 340, the screen sharing module 350, and the audio beamforming module 360. The echo cancellation module 340, the screen sharing module 350, and the audio beamforming module 360 may be implemented by software (or programs) but may be implemented as separate hardware components.

The echo cancellation module 340 may perform a dual output function 3411 for outputting the audio signal (S) in reception data received from the counterpart device through the communication module 310 as the output for reference signal processing and the output to the screen sharing module, a function 3412 for measuring (or calculating or estimating) latency between the external device and the electronic device 101 and applying latency to the counterpart audio signal (S) to process the dynamic buffer, and a function 3413 for removing the echo signal (for example, y (the speaker signal of the external device)) from the microphone input signal (for example, V+y) on the basis of the reference signal (for example, S+d(x)) to which the latency with the external device is applied.

The screen sharing module 350 may perform a function for providing the audio signal (S) and the video signal (M) received from the counterpart device to the external device through the communication module 310. For example, the screen sharing module 350 may mirror information related to a video call to the external device. The screen sharing module 350 may transmit counterpart image data and counterpart audio data received from the counterpart device. According to various embodiments, the screen sharing module 350 may transmit video data (for example, a user image) of the electronic device to be transmitted to the counterpart device.

The audio beamforming module 360 may perform audio beamforming on the basis of speaker information identified in the image acquired from a camera (not shown) and amplify the microphone input signal located in the identified speaker direction. The audio beamforming module 360 may provide a microphone input signal in which a voice is emphasized to the echo cancellation module 340.

According to various embodiments, the audio beamforming module 360 may be omitted.

According to various embodiments, the processor 330 may receive the reference signal (in other words, reference data) for echo cancellation processing of the external device from a second external device different from the external device and remove the echo signal on the basis of the reference signal transmitted from the second external device without the dual output operation if the reference signal is acquired from the second external device.

According to various example embodiments, the electronic device may include a communication module comprising communication circuitry, at least one microphone, and the processor, and the processor may be configured to: make a connection with an external device through the communication module and switch a call audio signal path to an external device output path in response to a call connection with a counterpart device, copy a call audio signal transferred to the counterpart device, provide a first signal to an echo cancellation module comprising echo cancellation circuitry, and provide a second signal to the external device through the external device output path, measure latency between the external device and the electronic device and reflect the measured latency to variably adjust a size of a dynamic buffer for each cancellation processing, generate a reference signal delayed from the first signal using the adjusted dynamic buffer, and cancel an echo signal for the second signal generated by a speaker of the external device from a microphone input signal acquired from the at least one microphone, based on the generated reference signal.

According to various example embodiments, the processor may be further configured to switch the call audio signal path to the external device output path in response to a condition of activating a speakerphone function and accepting the use of an external output device according to the connection with the counterpart device.

According to various example embodiments, the processor may be configured to execute a screen sharing module comprising screen sharing circuitry, based on acceptance of the use of the external output device and provide the second signal to the screen sharing module, and the screen sharing module may be configured to support a screen mirroring function of providing at least one of image data and audio data to the external device connected to the electronic device.

According to various example embodiments, the processor may be configured to measure latency through at least one of an audio profiling scheme of calculating latency by analyzing log information indicating a point of each layer at which specific audio data is checked when the specific audio data moves, an inaudible frequency scheme of calculating latency through an inaudible frequency output, and an ultra-wideband (UWB) scheme of calculating latency through a UWB signal.

According to various example embodiments, the processor may be configured to increase the size of the dynamic buffer based on the measured latency being larger than latency applied to the dynamic buffer.

According to various example embodiments, the processor may be configured to record zero data in the increased dynamic buffer to generate the reference signal based on there being no data to be recorded in the reference signal before the latency is measured.

According to various example embodiments, the processor may be configured to decrease the size of the dynamic buffer based the measured latency being than latency applied to the dynamic buffer.

According to various example embodiments, the processor may be configured to generate the reference signal by dropping a part of the first signal by the decreased size of the dynamic buffer in response to the decrease in the size of the dynamic buffer.

According to various example embodiments, the processor may be configured to measure initial latency with the external device, measure minimum latency and maximum latency, based on the initial latency and a communication distance and copy all of zero data or a reference signal to a dynamic buffer located between the minimum latency and the maximum latency, and analyze a similarity between a frame of the reference signal and a frame of the microphone input signal and cancel the echo signal from the microphone input signal, based on a most similar frame.

According to various example embodiments, the electronic device may further include a camera, the microphone may include a plurality of microphone arrays, and the processor may be configured to receive speaker identification information through the camera, beamform and amplify a microphone input in a direction in which a speaker is located among respective microphone inputs, and cancel an echo signal for the second signal generated by the speaker of the external device from the amplified microphone input signal.

FIG. 4 is a diagram illustrating an example system hierarchical structure of the electronic device according to various embodiments.

Referring to FIG. 4, according to an embodiment, the hierarchical structure of the electronic device 101 may include an application layer, a framework layer, a hardware abstraction layer, and a kernel layer, and may further include a hardware layer which is not illustrated in FIG. 4.

In the application layer, when, for example, a video call app (voice over Internet protocol (VoIP) app) or a video call process is executed, an application 410 may make a request for a screen configuration and voice processing to an echo canceller manager of the framework layer.

For example, the application 410 may make a request for processing an audio signal received from the counterpart device to an audio framework 420. The audio framework may perform audio signal processing 4211 (for example, playback), generate a reference signal (in other words, reference data) by adjusting a dynamic buffer through a reference data preprocessor (RDF) 4213 and performing dynamic buffering, and transfer the dynamic-processed reference signal to an echo canceller (echo cancellation) 4311 of the audio hardware abstraction layer 430. The echo canceller 4311 may cancel an echo signal from a sound signal (in other words, a microphone input signal) input from the microphone on the basis of the transferred reference signal.

According to various embodiments, audio beamforming 4312 of the audio hardware abstraction layer may perform audio beamforming in a speaker direction on the basis of the microphone input signal and an image signal (for example, camera data) processed by the camera framework 450. The audio beamformed signal may be transferred to an audio recorder (audio record) 4212 and transferred to an audio encoder 4612 of a media recorder 460.

A camera hardware abstraction layer 440 may generate an image signal input through a camera and transfer the image signal to the camera framework 450. The camera framework 450 may make a request for processing the image signal to the media recorder 460.

The media recorder 460 may process the image signal processed from the camera framework 450 through the video encoder 4611 and process the audio signal processed from the audio framework 420 through the audio encoder 4612, and then merge the image signal and the audio signal (container) 4613. The media recorder 460 may perform camcording 470 on the merged signal and transfer the signal to the application 410 (for example, the video call app). The application 410 (for example, a video processing app) may process the audio signal from which echo is cancelled and the image signal to be transferred to the counterpart device.

Figure 5:
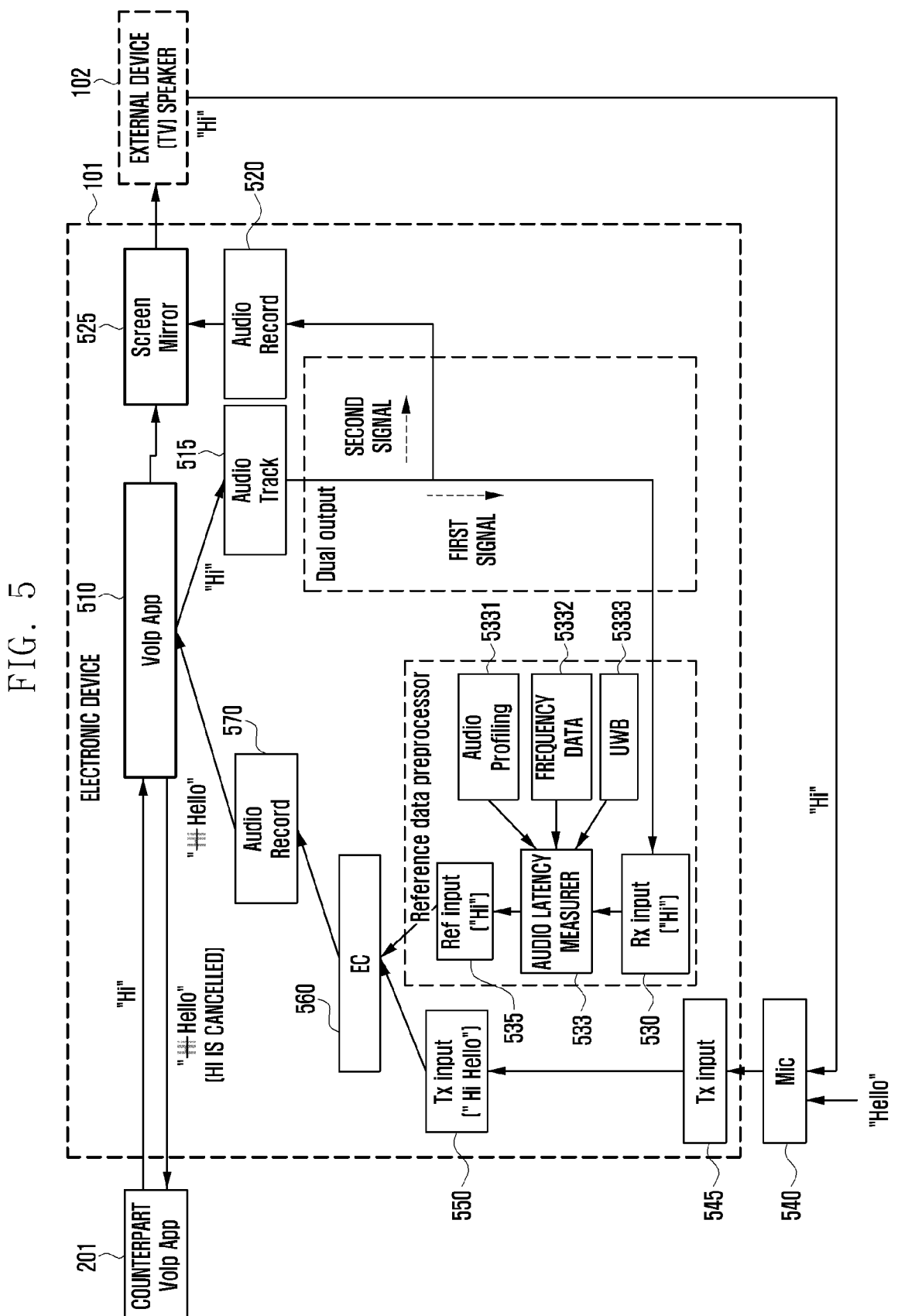
FIG. 5 is a diagram illustrating an example configurations of the echo cancellation operation of the electronic device according to various embodiments.

FIG. 5 is a diagram illustrating example configurations of the echo cancellation operation of the electronic device according to various embodiments.

Referring to FIG. 5, the electronic device 101 according to an embodiment may cancel an echo signal generated through inflow of a speaker sound of an external device 102 (for example, the external device 102 of FIG. 2) during the call connection with a counterpart device (for example, the counterpart device 201 of FIG. 2) through interworking with the external device 102.

The electronic device 101 may transmit and receive video call data to and from the counterpart device 201 through a video call app 510 (for example, voice over IP (VoIP)) In order to output reception data of the counterpart device 201 to the external device 102, the video call app 510 may transfer the reception data (for example, hi or image) received from the counterpart device 201 to a screen mirroring module 525 and transfer the reception data to an audio track 515 for audio signal processing.

The audio track 515 may extract the audio signal (for example, hi) from the reception data, copy the audio signal (for example, hi) through the dual output, transmit a first signal (for example, hi) to a dynamic buffering module (for example, a reference data preprocessor), and transmit a second signal (for example, hi) to an audio recorder 520 to allow the external device 102 to output the counterpart signal (for example, hi). The second signal (for example, hi) may be transferred to the screen mirroring module 525 through the audio recorder 520 and transferred to the external device 102 through the screen mirroring module 525. The external device 102 may output the audio signal of the counterpart device 201 transferred from the screen mirroring module 525 to the speaker. The external device 102 may receive the image signal of the counterpart device 201 from the screen mirroring module 525 and display the counterpart image through the display.

The first signal (for example, hi) may be input into input data (Rx input) 530 of the dynamic buffering module to generate a reference signal (or reference data) for echo cancellation. An audio latency measurer 533 may measure latency (in other words, a delay degree) between the external device 102 and the electronic device 101. For example, latency may be measured through at least one of an audio profiling scheme 5331 of, when specific audio data moves, calculating latency by analyzing log information indicating a point of each layer at which the specific audio data is checked, an inaudible frequency scheme 5332 of calculating latency through the output of an inaudible frequency, and a UWB scheme 5333 of calculating latency through an ultra-wideband (UWB) signal.

Reference signal generation (ref input) may correspond to the generation of a dynamically-buffered (or delayed) reference signal (for example, ref input (hi)+buffering time (d(x)) by reflecting measured latency in the input signal (Rx input) (for example, hi) 535, and the generated reference signal may be transferred to the echo canceller 560.

The microphone 540 may collect user voice signals (for example, hello). The speaker sound (for example, hi) output from the speaker of the external device 102 may be collected through the microphone 540. The microphone input signal acquired by the microphone 540 is transmission data (Tx input 545, in other words, the voice signal (for example, hello) and the speaker signal (for example, hi) 550 of the external device 102) and may be input into the echo canceller 560.

The echo canceller 560 may cancel the echo signal on the basis of the dynamically-buffered reference signal (for example, hi+d(x)) from the microphone input signal (for example, hi+hello). The echo canceller 560 may transfer the microphone input signal (for example, hello) from which the echo signal is cancelled to the audio recorder 570. The audio recorder 570 may provide the microphone input signal (for example, hello) from which the echo signal is cancelled to the video call app 510. Although not illustrated, the electronic device 101 may acquire a user image through a camera (not shown) and transfer the user image to the counterpart device 201 together with the microphone input signal from which the echo signal is cancelled.

Figure 6:
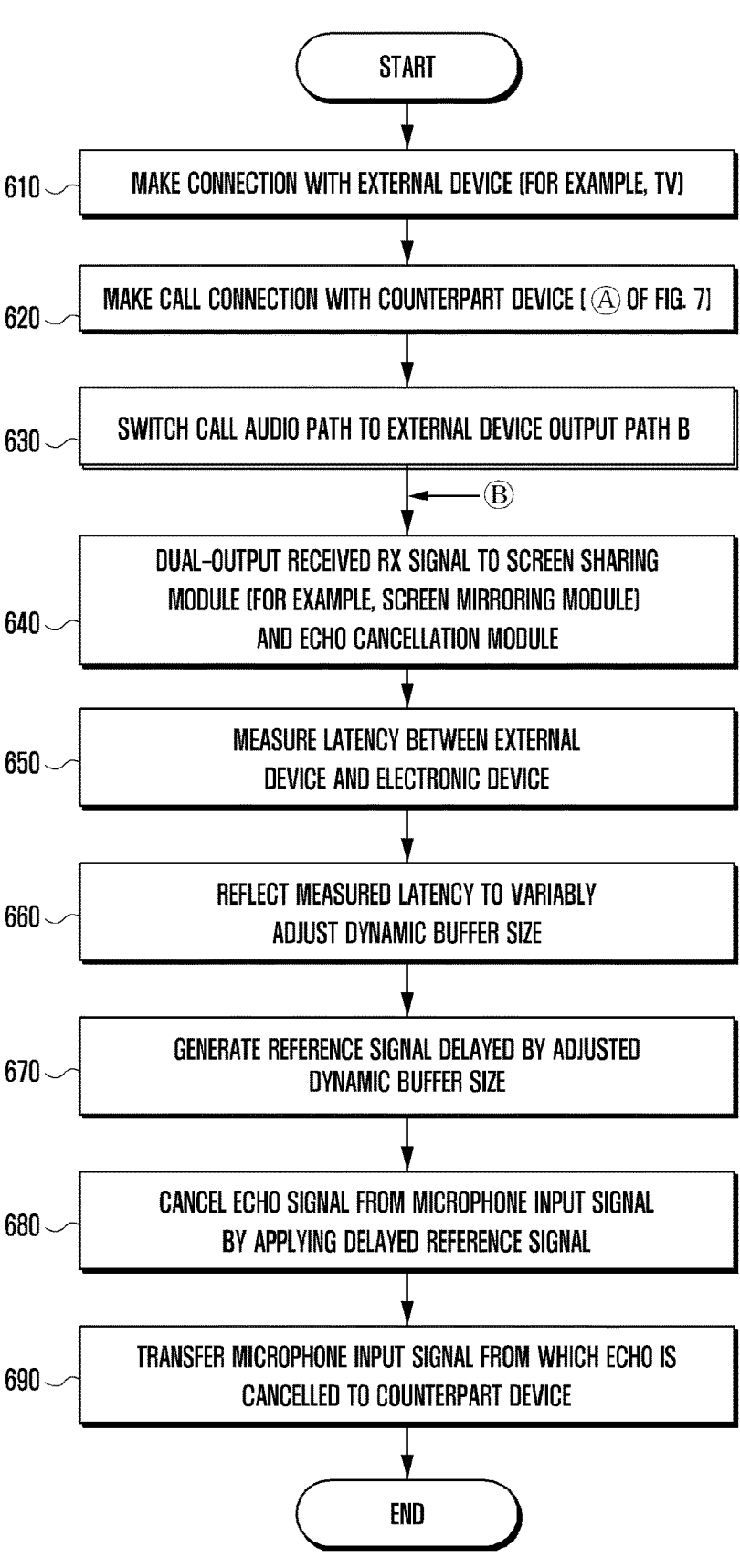
FIG. 6 is a flowchart illustrating an example method by which the electronic device cancels the echo signal flowing therein by the external device according to various embodiments.

FIG. 6 is a flowchart illustrating an example method by which the electronic device cancels the echo signal flowing therein by the external device according to various embodiments.

Referring to FIG. 6, according to an embodiment, a processor (for example, the processor 120 of FIG. 1 or the processor 330 of FIG. 3) of the electronic device 101 may control the connection with an external device (for example, TV) in operation 610.

According to an embodiment, the processor 330 may perform an operation for the connection with the external device in response to a request for executing a screen sharing function. The processor 330 may execute a screen sharing process in response to a request for executing a screen sharing application (for example, smart view or smart mirroring).

According to an embodiment, the screen sharing application may provide a list of registered external devices and make a communication connection with the selected external device in response to selection of the external device. The external device list may include an external device newly found through short-range communication with the electronic device or a registered external device. In the external device list, an activated external device and a deactivated external device may be displayed to be visually distinguished from each other.

According to various embodiments, when it is identified that the external device is turned off, the user may turn on the external device. After selecting the external device in a turn-off state which satisfies a turn-on condition, the electronic device 101 may make the connection with the external device.

According to various embodiments, the screen sharing application may make the connection with the external device in response to the turn-on condition of the previously connected external device through connection history information.

According to various embodiments, when the screen sharing application is executed, the screen sharing application may output information on the found external device and make the connection with the external device in response to reception of an accept input of the user.

In operation 620, the processor 330 may make a call connection with the counterpart device.

According to an embodiment, the processor 330 may make the call connection with the counterpart device in response to an accept input for the call connection request received from the counterpart device or reception of a response signal for the call request by the counterpart device. For example, the electronic device 101 may make the call connection with the counterpart device through a video call application (for example, voice over IP (VoIP)). A voice over IP (VoIP) application may perform voice communication and multimedia session communication through a voice Internet protocol (VoIP, voice over Internet protocol, voice over IP, or IP telephony).

In operation 630, the processor 330 may switch a call audio reception path to an external device output path in response to execution of the call connection with the counterpart device through interworking with the external device.

According to an embodiment, the processor 330 may switch the audio reception path to the external device output path on the basis of a connection state with the external device and a speakerphone activation state. This will be described in detail with reference to FIG. 7.

According to various embodiments, the processor 330 may switch the audio reception path to the external device output path on the basis of a condition of the executed screen mirroring function and a condition of the made call connection.

In operation 640, the processor 330 may perform the dual output by outputting the audio signal (for example, the Rx signal) received from the counterpart device to the screen sharing module (for example, the screen mirroring module) and the echo cancellation module.

According to an embodiment, the processor 330 may copy the audio signal in the reception data of the counterpart device, output (or provide) a first signal to the echo cancellation module, and output (or provide) a second signal to the screen sharing module.

In operation 650, the processor 330 may measure latency (in other words, a delay degree) between the external device and the electronic device.

According to an embodiment, the processor 330 may measure latency between the external device and the electronic device through at least one of an audio profiling scheme, an inaudible frequency scheme, and a UWB scheme.

The audio profiling scheme may include a scheme of, when specific audio data moves, calculating latency by analyzing log information indicating a point of each layer at which the specific audio data is checked. For example, the audio profiling scheme may measure latency until shared data (for example, a counterpart audio signal) is transmitted from the audio framework to the screen sharing module. A description of the audio profiling scheme is made in greater detail below with reference to FIG. 8.

The inaudible frequency scheme may be a scheme of calculating latency through the inaudible frequency output. For example, the electronic device 101 may insert inaudible frequency data into output data (for example, the counterpart audio signal) transmitted to the external device at predetermined intervals and output the output data. A sound output from the external device may be delayed and output according to a radio environment. The electronic device 101 may identify inaudible frequency data delayed from the sound output from the external device. The electronic device 101 may measure latency by comparing a time at which the inaudible frequency is output from the external device with a time at which frequency data is in the microphone input signal.

The UWB scheme may be a scheme of calculating latency through an ultra-wideband (UWB) signal. The ultra-wideband (UWB) signal may transmit large information with low power over a wide band. The electronic device 101 may measure a distance from the external device using the ultra-wideband (UWB) signal. The electronic device 101 may measure latency by measuring a transmission rate and a sound change on the basis of the distance from the external device.

In operation 660, the processor 330 may reflect the measured latency to variably adjust the size of a dynamic buffer.

According to an embodiment, the processor 330 may generate a dynamic buffer for storing a signal which is the reference for echo cancellation (in other words, the dynamic buffer). The dynamic buffer may be configured to have the size that is not fixed and dynamically varies depending on latency between the external device and the electronic device.

According to an embodiment, the processor 330 may increase the size of the dynamic buffer to be larger than the currently configured size when latency increases and may decrease the size of the dynamic buffer to be smaller than the currently configured size when latency decreases. For example, when measured latency increases to be a positive integer in the state in which the latency is configured as 0, the processor 330 may perform control to decrease the size of the dynamic buffer by −1 from the positive integer.

In operation 670, the processor 330 may generate a reference signal (in other words, reference data or ref in) by delaying the counterpart audio signal by the controlled size of the dynamic buffer.

In operation 680, the processor 330 may cancel the echo signal from the microphone input signal by applying the delayed reference signal. For example, the processor 330 may acquire only the counterpart voice signal by cancelling the reference signal, which is delayed by latency with the external device from the counterpart audio signal received from the counterpart device, from the microphone input signal (in other words, including the user voice signal and the speaker sound of the external device).

In operation 690, the processor 330 may transfer the microphone input signal from which echo is canceled to the counterpart device.

Figure 7:
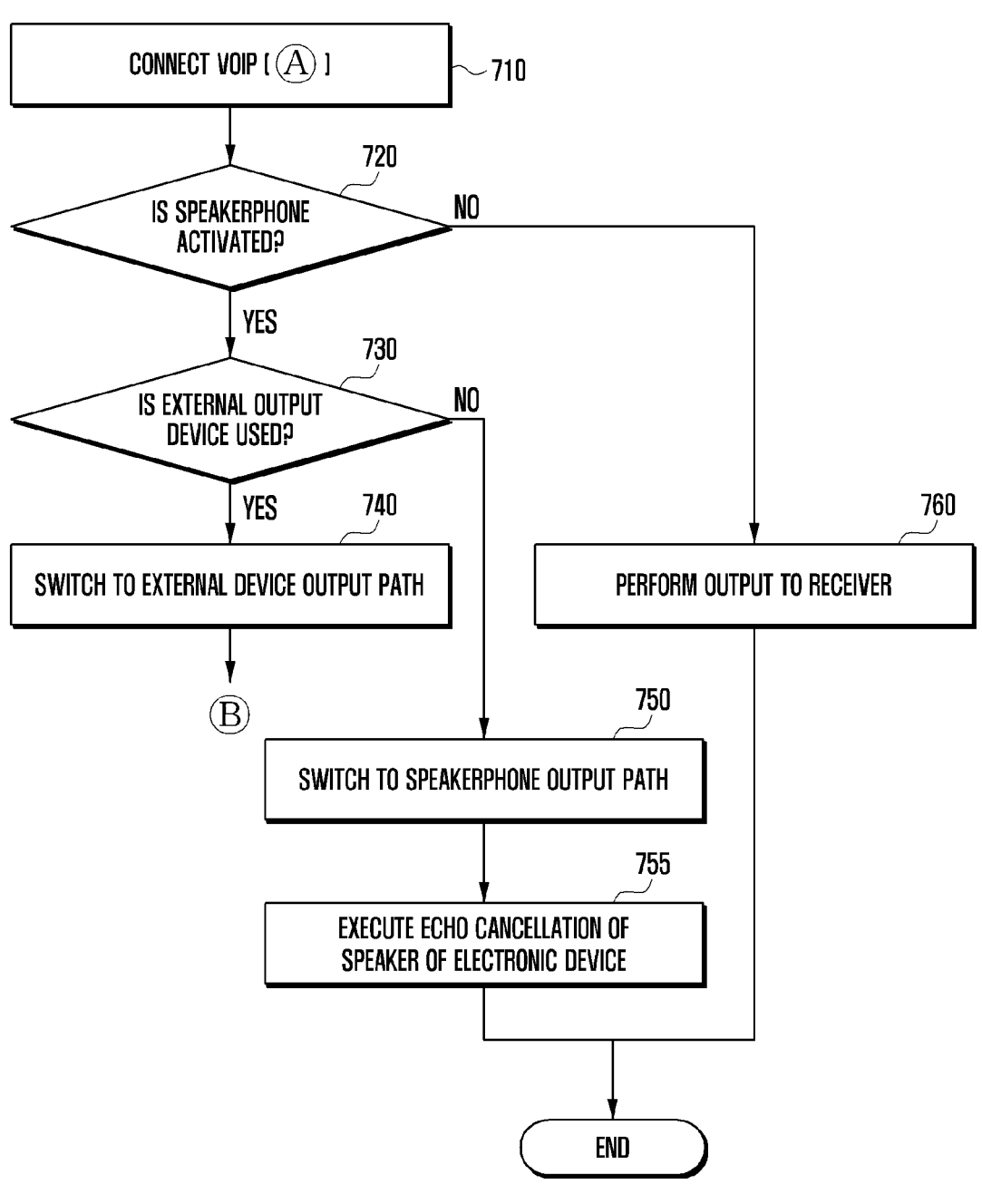
FIG. 7 is a flowchart illustrating an example method by which the electronic device cancels the echo signal flowing therein by the external device according to various embodiments.

FIG. 7 is a flowchart illustrating an example method by which the electronic device cancels the echo signal flowing therein by the external device according to various embodiments.

Referring to FIG. 7, according to an embodiment, the electronic device 101 may support a function of switching an audio output path on the basis of speakerphone information of the electronic device 101 and connection information with the external device in response to a call connection with a counterpart device (for example, the counterpart device 201 of FIG. 2).

According to an embodiment, a processor (for example, the processor 330 of FIG. 3) of the electronic device 101 may make the call connection through voice over IP (VoIP) with the counterpart device like operation A of FIG. 6 in operation 710.

In operation 720, the processor 330 may determine whether a speakerphone function is activated when the call connection is made. For example, the processor 330 may not activate the speakerphone function when the call connection with the counterpart device is made. In another example, the processor 330 may perform control to activate the speakerphone function when a video call is made. In another example, the processor 330 may receive a user input making a request for activating the speakerphone function.

If the speakerphone function is not activated when the call connection is made, the processor 330 may proceed to operation 760 and configure (or maintain) a receiver path of the electronic device.

In operation 730, the processor 330 may determine whether to use the external device output in response to activation of the speakerphone function.

According to an embodiment, the processor 330 may output notification information that inquiries the user about operation manual of the use of the external device on the display in response to the call connection with the counterpart device. The electronic device 101 may proceed to operation 740 in response to reception of an acceptance input from the user and switch the call audio path to the external device output path. Operation 740 may be the same as or similar to operation 630 of FIG. 6, and operations after operation 630 may be performed.

When the user rejects the use of the external device output in operation 730, the processor 330 may proceed to operation 750.

In operation 750, the processor 330 may switch the audio output path of the reception data (Rx) received from the counterpart device to the speakerphone output path in response to the non-use of the external device output in spite of activation of the speakerphone function. In operation 755, the processor 330 may perform echo cancellation for the signal, which is output from the speaker of the electronic device 101 and flows into the microphone of the electronic device 101. For example, the processor may generate a reference signal on the basis of the signal received from the counterpart device and cancel an echo signal (corresponding to a counterpart audio signal output by the speakerphone of the electronic device) from the microphone input signal.

According to various embodiments, the electronic device 101 may omit operation 730, proceed to operation 740 in response to a condition for the connection with the external device and automatic activation of the speakerphone by the call connection, and switch the audio output path of reception data received from the counterpart device to the external device output path.

Figure 8:
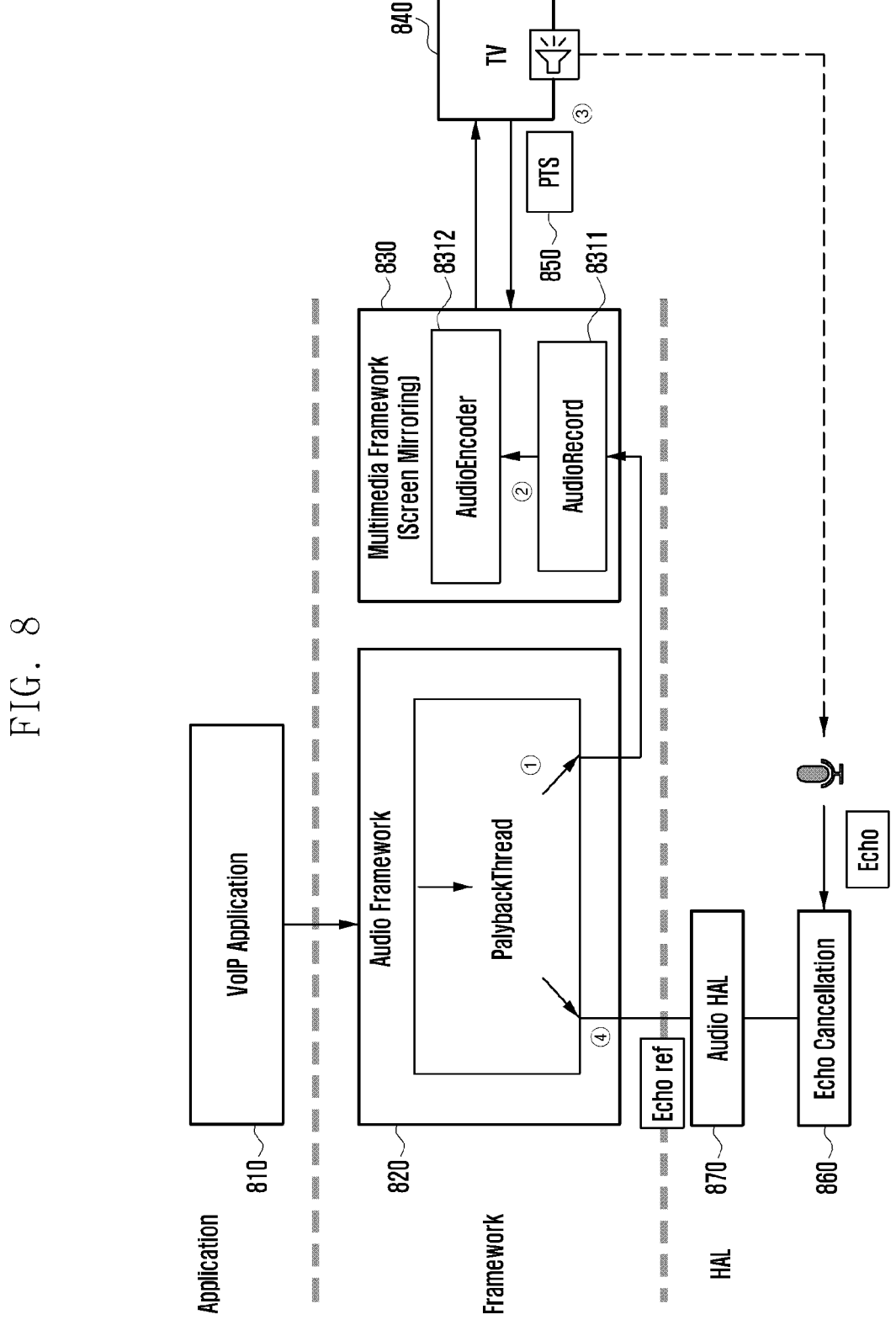
FIG. 8 is a diagram illustrating an example of a latency measurement operation of the electronic device according to various embodiments.

FIG. 8 is a diagram illustrating an example of a latency measurement operation of the electronic device according to various embodiments.

Referring to FIG. 8, according to an embodiment, the electronic device 101 may support a function of measuring latency between the electronic device 101 and an external device 840 (for example, the external device 102 of FIG. 5) on the basis of an audio profiling scheme.

For example, the electronic device 101 may determine a fixed reference point, in other words, an offset value by measuring a time spent for a counterpart audio signal received form a video call app 810 (for example, a VoIP application) to reach a multimedia framework 830 (for example, a screen sharing module or a screen mirroring module) from an audio framework 820.

According to an embodiment, the electronic device 101 may perform the dual output for the counterpart audio signal received from the counterpart device to an audio hardware abstraction layer 870 and the screen mirroring module of the multimedia framework 830. Playback thread of the audio framework may copy the counterpart audio signal, output a first signal ④ to the audio hardware abstraction layer 870, and output a second signal ① to an audio recorder 8311.

The audio recorder 8311 may output the second signal, that is, the counterpart audio signal to an audio encoder 8312, and the audio encoder 8312 may transfer the second signal to an external device 840.

The electronic device 101 may receive a present timestamp (PTS) 850 from the external device 840. The multimedia framework (for example, or the screen mirroring module) 830 may calculate a time difference until the output of the counterpart audio signal from the external device 840 to the speaker. The present timestamp (PTS) may refer, for example, to time information actually output when audio or video data is transmitted to the external device 840 (for example, TV). The electronic device 101 may dynamically measure latency by adding the present timestamp (PTS) to the determined offset value. The electronic device 101 may dynamically predict an audio output time from the audio framework 820 to the external device 840 during communication with the external device 840.

The electronic device 101 may generate a reference signal for echo cancellation by applying the measured latency to the offset value. An echo canceller 860 of the audio hardware abstraction layer 870 may cancel an echo signal for a speaker sound of the external device 840 on the basis of the reference signal transmitted from the framework 820 and a microphone input signal.

Figure 9:
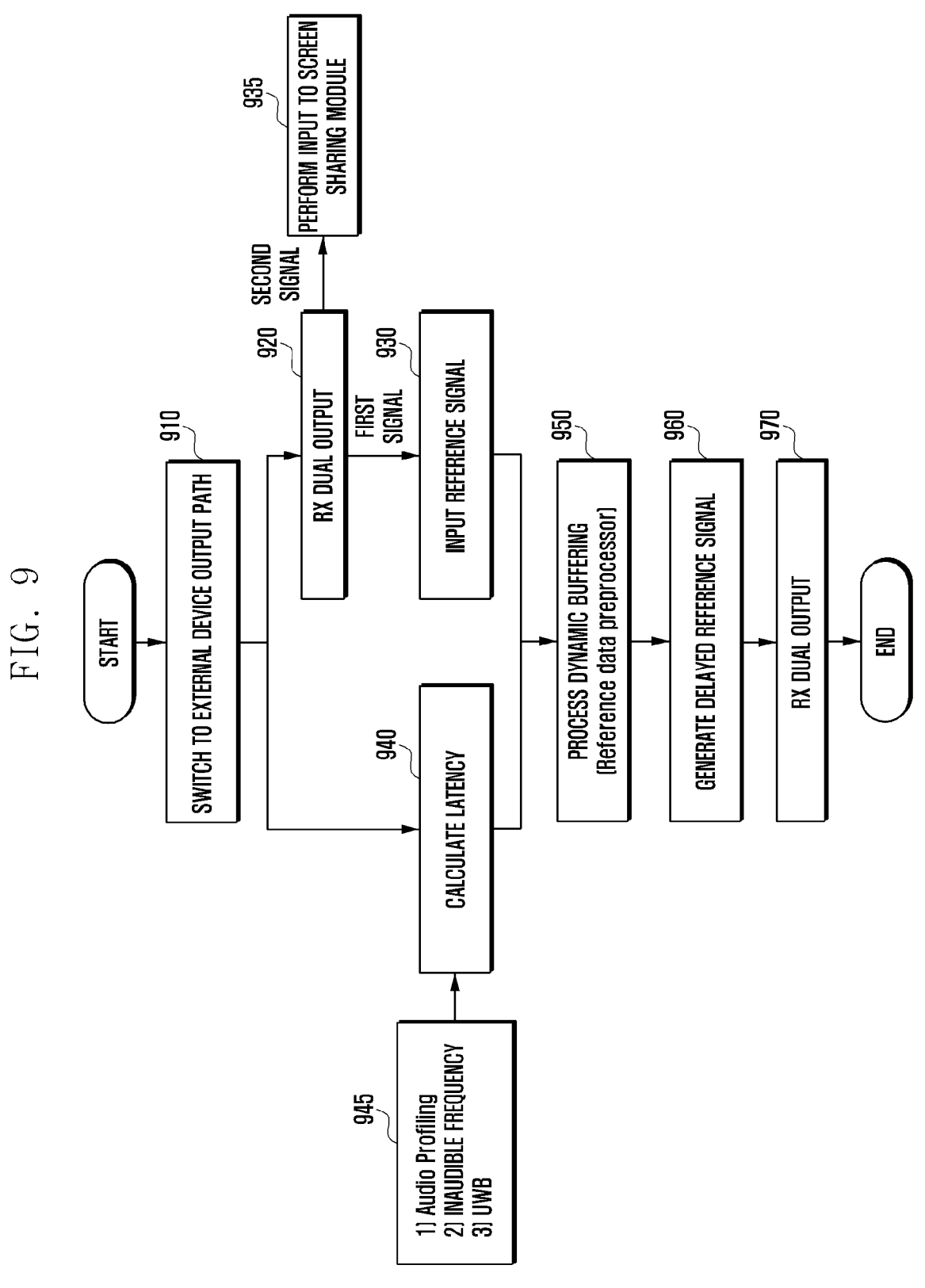
FIG. 9 is a flowchart illustrating an example method by which the electronic device cancels an echo signal flowing therein by the external device according to various embodiments.

FIG. 9 is a flowchart illustrating an example method by which the electronic device cancels an echo signal flowing therein by the external device according to various embodiments.

Referring to FIG. 9, according to an embodiment, a processor (for example, the processor 330 of FIG. 3) of the electronic device 101 may switch an audio output path of reception data received from the counterpart device to an external device output path in operation 910.

In operation 920, the processor 330 of the electronic device 101 may perform the dual output for a first signal to secure a reception signal (Rx) received from the counterpart device through an echo cancellation module as a reference signal of the electronic device and a second signal to be transmitted to the external device in response to switching to the external device output path.

According to an embodiment, the processor 330 may copy the audio signal (in other words, the counterpart audio signal) in the reception data received from the counterpart device and separate the audio signal into the first signal and the second signal.

In operation 930, the processor 330 may secure the first signal as an input signal for generating the reference signal. In operation 935, the processor 330 may provide the second signal which is the same as the first signal to the screen sharing module and output the second signal to the external device.

In operation 940, the processor 330 may measure latency between the electronic device 101 and the external device.

According to an embodiment, in operation 945, the processor 330 may measure latency through at least one of an audio profiling scheme of, when specific audio data moves, calculating latency by analyzing log information indicating a point of each layer at which the specific audio data is checked, an inaudible frequency scheme 5332 of calculating latency through the output of an inaudible frequency, and a UWB scheme of calculating latency through an ultra-wideband (UWB) signal.

In operation 950, the processor 330 may generate dynamic buffering data by applying latency into the input reference signal.

According to an embodiment, the processor 330 may reflect the measured latency to adjust the size of the dynamic buffer and record zero data or previously recorded reception data in the adjusted dynamic buffer, so as to generate dynamic buffering data.

In operation 960, the processor 330 may delay the reference signal by the dynamic buffering data and generate the delayed reference signal.

In operation 970, the processor 330 may cancel an echo signal from the microphone input signal on the basis of the delayed reference signal. The reference signal for cancelling the echo signal is latency measured between the electronic device and the external device, and thus the electronic device 101 may effectively cancel the echo signal flowing therein by the speaker sound of the external device.

Figure 10:
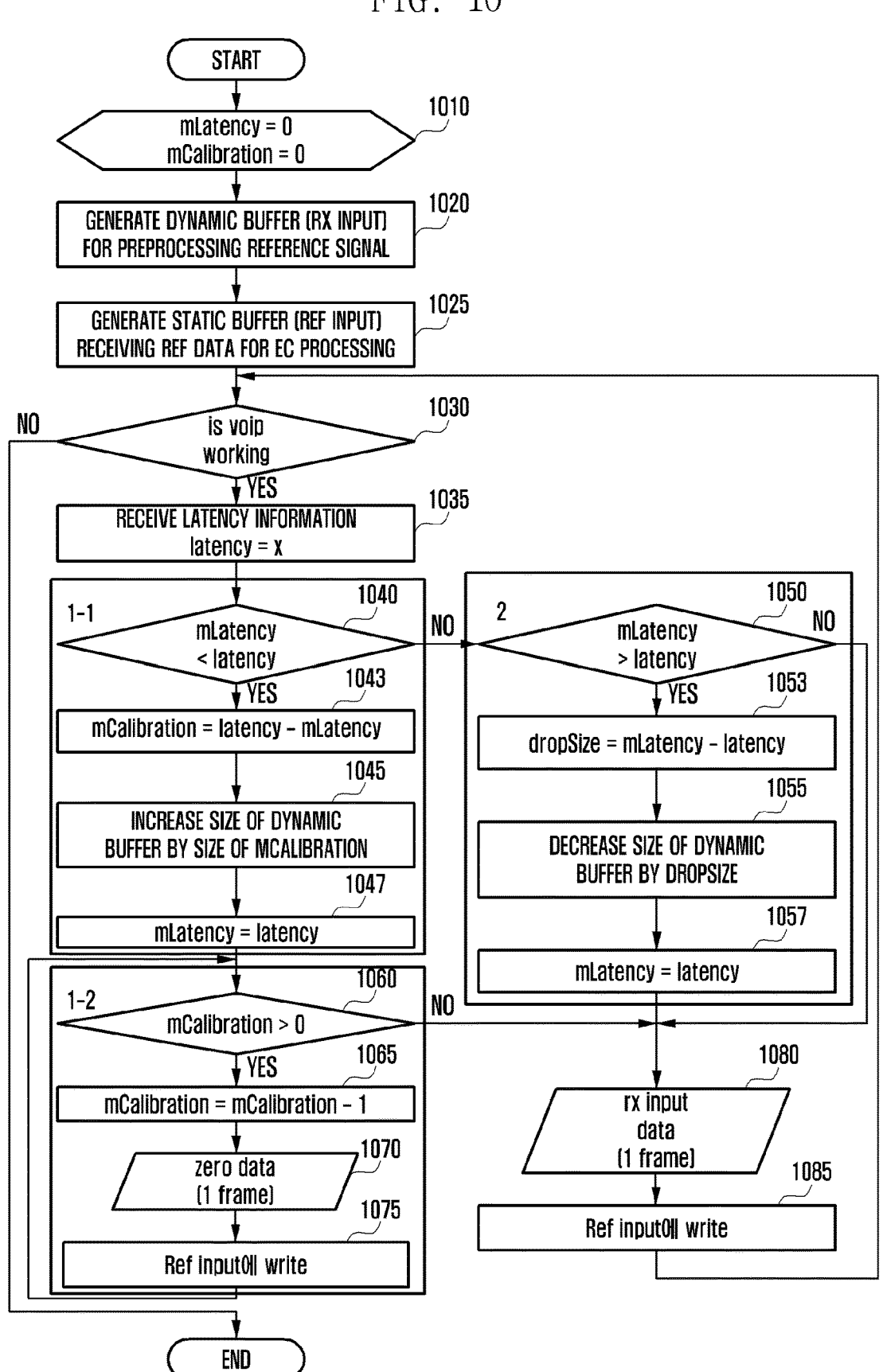
FIG. 10 is a flowchart illustrating an example operation of a dynamic buffering module of the electronic device based on measurement of a latency value according to various embodiments.

FIG. 10 is a flowchart illustrating an example operation of a dynamic buffering module of the electronic device based on measurement of a latency value according to various embodiments.

Referring to FIG. 10, according to an embodiment, a processor (for example, the processor 120 of FIG. 1 or the processor 330 of FIG. 3) of the electronic device 101 may configure mLatency (in other words, a delay degree of the current output) as 0 and configure mcalibration (in other words, the length of zero data which should be output for the delay output) as 0 in operation 1010.

In operation 1020, the processor 330 may generate a dynamic buffer for recording the counterpart audio signal (for example, Rx in) received from the counterpart device for preprocessing of the reference signal, in other words, reference data. For example, the processor 330 may perform the dual output for the counterpart audio signal transferred from the video call app, record a first signal (for example, Rx in) in the dynamic buffer, and provide a second signal (for example, Rx in) to the screen sharing module.

In operation 1025, the processor 330 may generate a static buffer having the fixed size to store the reference signal for processing echo cancellation.

In operation 1030, the processor 330 may determine whether the video call (for example, VoIP app) is operating. The processor 330 may end the process when the video call (for example, VoIP app) is not operating.

In operation 1035, the processor 330 may receive a result of measurement of latency between the electronic device and the external device. For example, the measured latency may be assumed as X (X being an integer).

According to an embodiment, the processor 330 may measure latency through at least one of an audio profiling scheme of, when specific audio data moves, calculating latency by analyzing log information indicating a point of each layer at which the specific audio data is checked, an inaudible frequency scheme of calculating latency through the output of an inaudible frequency, and a UWB scheme of calculating latency through an ultra-wideband (UWB) signal.

The processor 330 may identify whether the measured latency is larger than mLatency in operation 1040, and may proceed to operation 1043 when the measured latency is larger than mLatency and proceed to operation 1050 and identify whether the measured latency is smaller than mLatency when the measured latency is not larger than mLatency.

In operation 1043, the processor 330 may calculate mcalibration by subtracting mlatency from the measured latency. For example, the measured latency is larger than mLatency and the measured latency is a positive value, and thus mcalibration may also be a positive value. In operation 1045, the processor 330 may increase the size of the dynamic data by the size of calculated mcalibration. After mlatency becomes the same as the currently measured latency in operation 1047, the processor 330 may determine whether mcalibration is larger than 0 in operation 1060, and proceed to operation 1065 and subtract 1 from calculated mcalibration and record when mcalibration is larger than 0, and record zero data in the dynamic buffer (for example, the size corresponding to calculated mcalibration −1) increased according to latency in operation 1070.

In operation 1075, the processor 330 may record the zero data recorded in the dynamic buffer and the counterpart audio signal (Rx in) in the static buffer as the reference signal (in other words, reference data) for each cancellation. The reference data recorded in the static buffer may be reference data (in other words, Rx in +d(x)) buffered (or delayed) by latency between the electronic device and the external device.

When the measured latency is smaller than mLatency, the processor 330 may determine the drop size by subtracting the measured latency from mlatency in operation 1053. In operation 1055, the processor 330 may reduce the size of the dynamic buffer by the determined drop size. After mLatency becomes the same as the measured latency in operation 1057, the processor 330 may record the received counterpart audio signal (Rx in) in the dynamic buffer in operation 1080. In operation 1085, the processor 330 may record the data recorded in the dynamic buffer in the static buffer as the reference signal (in other words, reference data) for echo cancellation.

FIGS. 11A, 11B, 11C and 11D are diagrams illustrating an example operation of generating a dynamically buffered reference signal according to various embodiments.

Figure 11A:
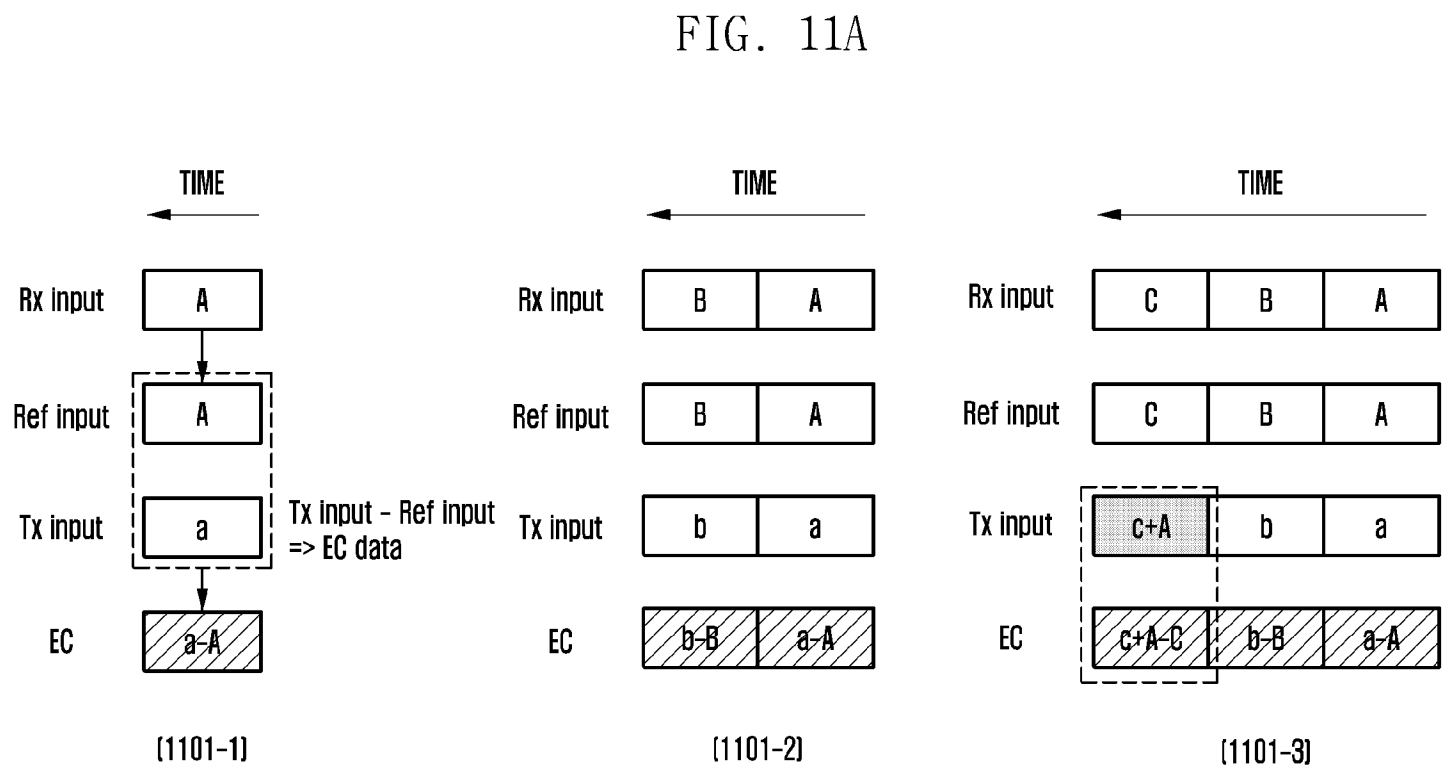
Figure 11B:
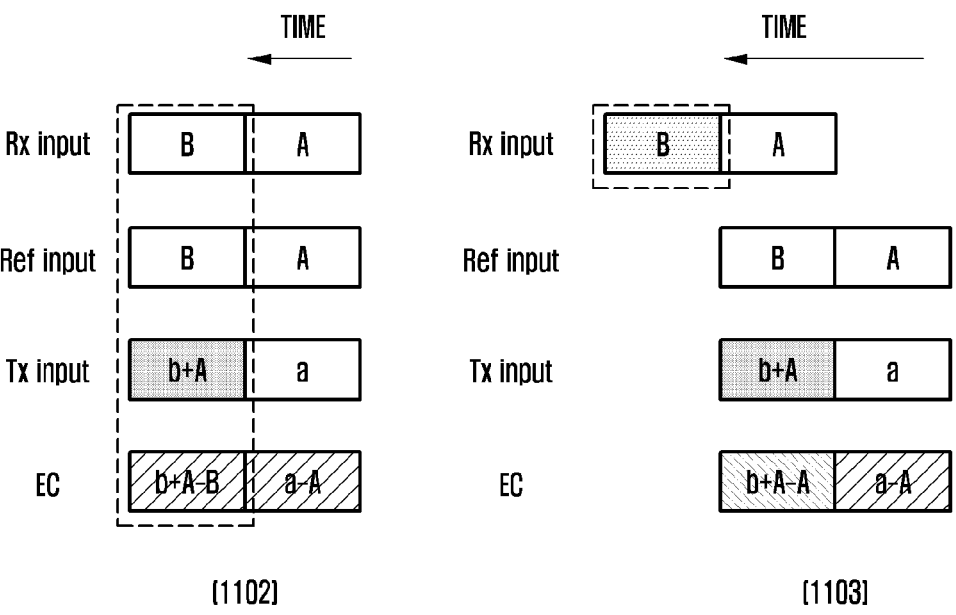
Figure 11C:
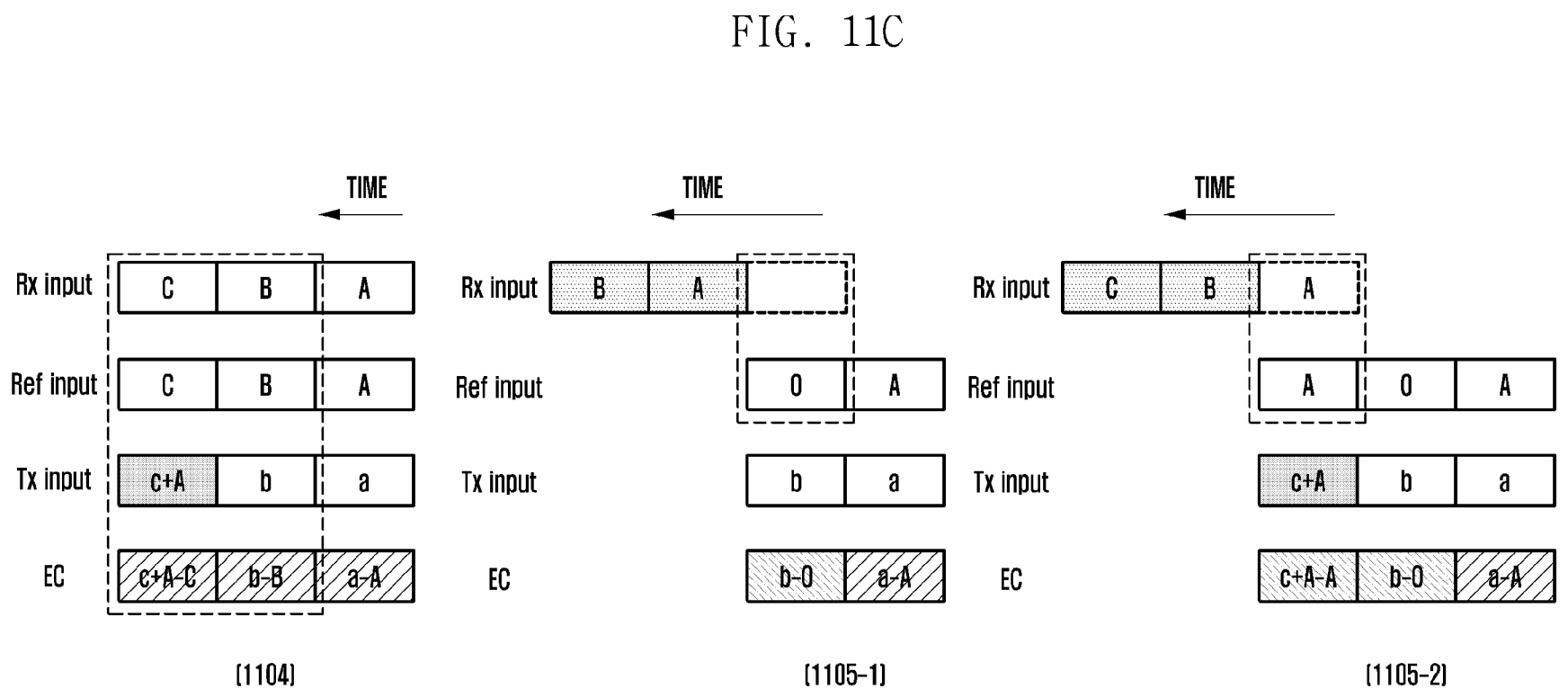
Figure 11D:
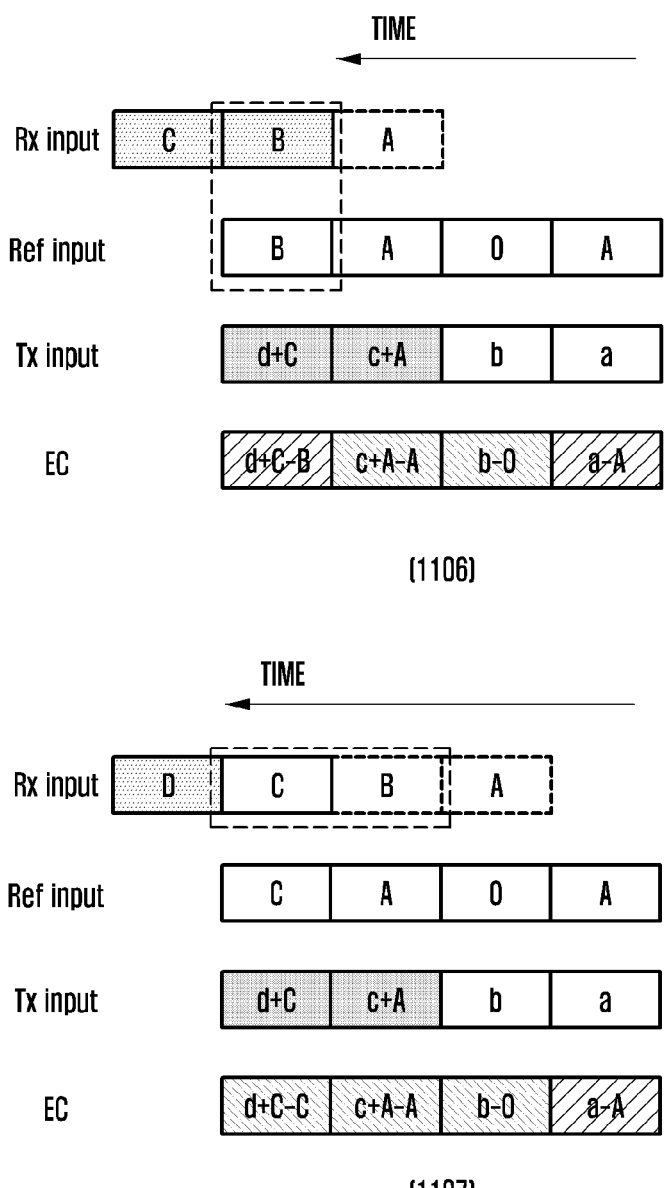

FIG. 11A illustrates a situation in which a reference signal is not delayed and thus echo cancellation for the inflow of a speaker sound of the external device is not performed, FIG. 11B illustrates a situation of processing data in the state in which latency increases, FIG. 11C illustrates zero data padding, and FIG. 11D illustrates a situation of processing data in the state in which latency increases and then decreases.

As illustrated in <1101-1> and <1101-2> of FIG. 11A, when it is assumed that the counterpart audio signal (Rx input) is input in the order of A, B, and C per frame (per buffer), the electronic device 101 may record A, B, and C per frame as a reference signal (Ref in) for echo cancellation. When a microphone signal is input into a, b, and c as transmission data (Tx input) to be transmitted to the counterpart device, the electronic device 101 may record data (EC) from which echo is cancelled as a signal (a-A, b-B) obtained by cancelling reference data (ref in) from the microphone input signal (Tx input). However, as illustrated in <1101-3>, a speaker sound (c) of the external device may flow into the microphone input signal. The speaker sound (c) of the external device may be a sound output after the counterpart audio signal (Rx input) transmitted from the electronic device to the external device is delayed. In this case, the speaker sound (c) of the external device may flow into the microphone of the electronic device 101 but the delay is not applied to the microphone input signal (Tx input), and thus the echo signal cannot be normally cancelled and sound quality may deteriorate.

In order to address the problem of FIG. 11A, the electronic device 101 according to various embodiments may measure latency between the external device and the electronic device 101 and perform dynamic buffering (in other words, adjust the size of the dynamic buffer) according to the measured latency, so as to generate a delayed reference signal.

According to an embodiment, in comparison with a process of processing dynamic buffering in the state in which latency with the external device increases to 1 to be larger than latency applied to the buffer, <1102> of FIG. 11B shows a situation of applying no delay and <1103> shows a situation of applying delay and generating a reference signal according to various embodiments. In the case of <1102>, a counterpart input signal B is configured, and thus echo for b (in other words, a speaker sound of the external device for the counterpart input signal B, an echo signal for B) flowing into by the external device is not cancelled even though a reference signal is cancelled from a microphone input signal.

On the other hand, in the case of <1103>, the electronic device 101 may increase the size of the dynamic buffer according to latency with the external device and index and record again previously recorded data A in the existing data without directly inputting the existing data, and remove a reference signal (A) from a microphone input signal (Tx input) (for example, b+A) when cancelling echo for fame 2, thereby cancelling an echo signal caused by the external device.

According to an embodiment, in comparison with a process of processing the dynamic buffering in the state in which latency with the external device increases by 2 than latency applied to the buffer, <1104> of FIG. 11C shows a situation to which no delay is applied, and <1105-1> and <1105-2> show a situation of applying delay and generating a reference signal according to various embodiments. In the case of <1104>, delay for c flowing into a microphone input signal is not applied on the basis of a frame in which a counterpart input signal is recorded as C and thus echo for c (in other words, a speaker sound of the external device for the counterpart input signal C, an echo signal for c) flowing from the external device is not cancelled.

On the other hand, referring to <1105-1> and <1105-2>, the electronic device 101 should delay the generation of the reference signal by reflecting the delayed size of 2 in reference data and thus may record zero data by the size of mCalibration and transfer the same to the reference signal. As illustrated in <1105-1>, when previously recorded data is indexed in the existing data but there is no data to use the existing microphone input signal, zero data may be recorded and delayed, and the previously recorded data A may be indexed and recorded to delay and generate the reference signal in the next frame as illustrated in <1105-2>. The electronic device 101 may cancel the echo signal caused by the external device by removing the reference signal (A) from the microphone input signal (Tx input) (for example, b+A).

According to an embodiments, in comparison with a process of processing dynamic buffering in the state in which latency with the external device decreases from 2 to 1 to be smaller than latency applied to the buffer, <1106> of FIG. 11D shows a situation of applying no delay and <1107> shows a situation of applying delay and generating a reference signal according to various embodiments.

Referring to <1106>, when an audio signal of the counterpart device is input in the order of A, B, and C and then latency increases to 2 and decreases to 1, the latency change is not applied, B is transmitted to the reference signal, and echo is cancelled by the reference signal for B with respect to the microphone input signal (d+c), and accordingly, the electronic device 101 may identify that echo for d flowing from the external device is not cancelled. On the other hand, referring to <1107>, when latency increases to 2 and then decreases to 1, the current latency is smaller than latency applied to the dynamic buffer, and thus the electronic device 101 may record C after dropping data B input as the reference signal by a latency difference in order to advance data to transmit the reference signal. The electronic device 101 may cancel an echo signal of a sound (c) of the speaker of the external device for C by reflecting C as a reference signal and cancelling the same for the microphone input signal d+C to which latency with the external device for the counterpart audio signal C is applied.

Figure 12:
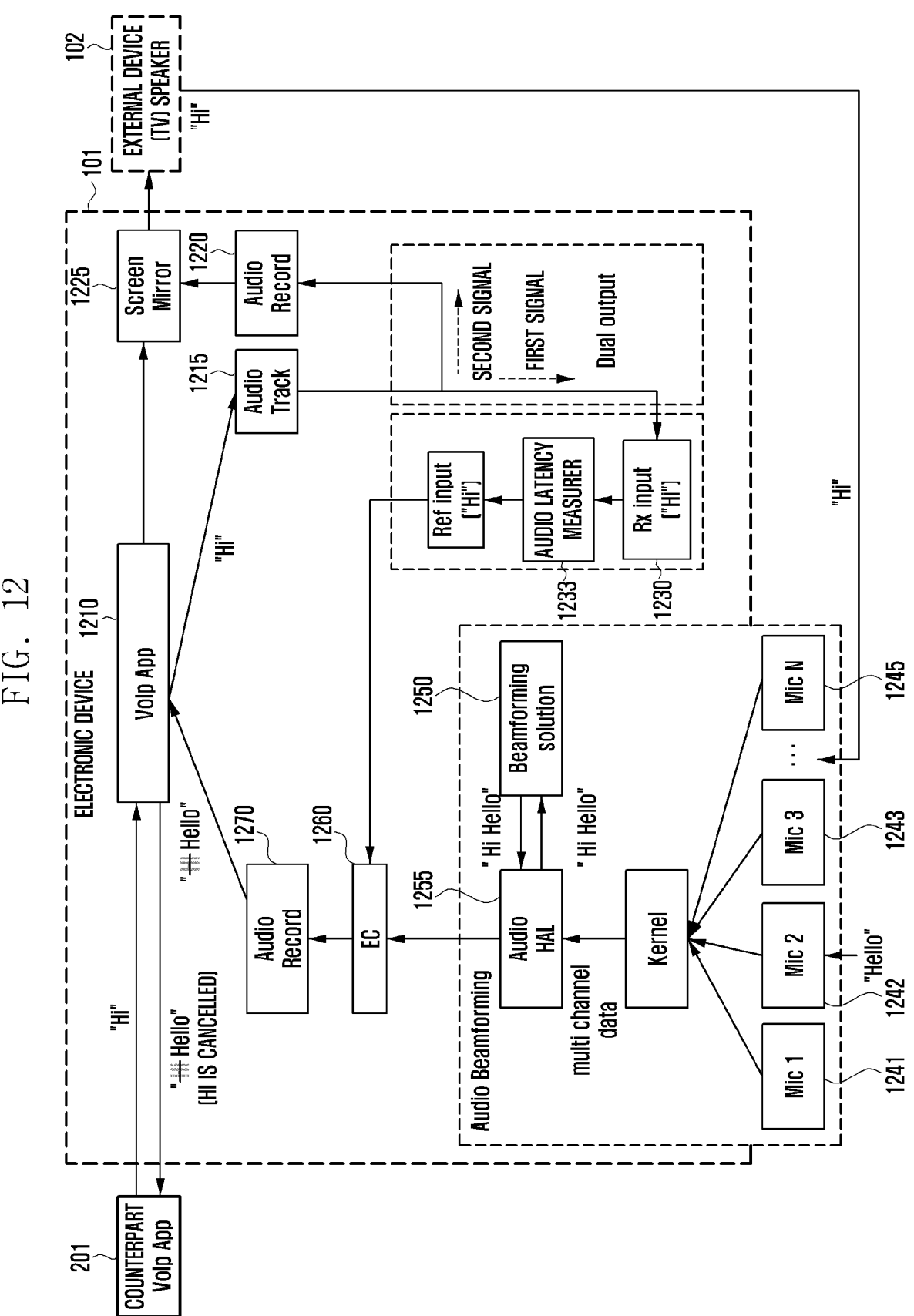
FIG. 12 is a diagram illustrating example configurations of the echo cancellation operation of the electronic device according to various embodiments.

FIG. 12 is a diagram illustrating example configurations of the echo cancellation operation of the electronic device according to various embodiments.

Referring to FIG. 12, according to an embodiment, the electronic device 101 may perform audio beamforming for a plurality of microphone inputs while performing a call connection with a counterpart device (for example, the counterpart device 201 of FIG. 2) through interworking with an external device (for example, the external device 102 of FIG. 2), amplify a microphone input signal in a speaker direction, and provide the amplified signal to an echo canceller 1260 as the microphone input signal. Dynamic buffering processing and dual output in FIG. 12 may be the same as or similar to those in FIG. 5.

The electronic device 101 may transmit and receive data to and from the counterpart device 201 through a video call app 1210 (for example, voice over IP (VoIP)) The video call app 1210 may transfer reception data of the counterpart device 201 to a screen mirroring module 1225 and an audio track 1215.

The audio track 1215 may extract an audio signal (for example, hi) from the reception data, copy the signal through the dual output, output a first signal (for example, hi) to a dynamic buffering module (for example, a reference data preprocessor), and output a second signal (for example, hi) to an audio recorder 1220. The audio recorder 1220 may transfer the first signal to the screen mirroring module 1225. The first signal may be transferred to the external device 102 through the screen mirroring module 1225. The external device 102 may output the first signal transferred from the screen mirroring module 1225, in other words, the audio signal (for example, hi) of the counterpart device 201 to a speaker. The external device 102 may receive the image signal of the counterpart device 201 from the screen mirroring module 1225 and display the counterpart image through the display.

The second signal (for example, hi) may be input as input data (Rx input) 1230 for generating a reference signal for echo cancellation. An audio latency measurer 1233 may measure latency (in other words, a delay degree) between the external device 102 and the electronic device 101. For example, latency may be measured through at least one of an audio profiling scheme of, when specific audio data moves, calculating latency by analyzing log information indicating a point of each layer at which the specific audio data is checked, an inaudible frequency scheme of calculating latency through the output of an inaudible frequency, and a UWB scheme of calculating latency through an ultra-wideband (UWB) signal.

Microphones 1241, 1241, 1243, . . . , 1245 of the electronic device may collect user voice signals (for example, hello). The microphones 1241, 1241, 1243, . . . , 1245 may collect signals (for example, hi) output from the speaker of the external device 102. The microphones 1241, 1241, 1243, . . . , 1245 may transfer the collected user voice signals to an audio hardware abstraction layer 1255 through a kernel. Audio beamforming 1250 may analyze feature information of speaker data, amplify a user voice collected in a direction in which the speaker is located, for example, a voice collected by microphone 2, and perform beamforming as a voice in which the voice is emphasized. The microphone input signal in which the voice is emphasized by audio beamforming may be input as an input signal of the echo canceller 1260.

According to various embodiments, the electronic device 101 may recognize a speaker's face through a camera module, recognize a direction in which the speaker is located, and provide the same to the audio beamforming 1250.

According to various embodiments, the electronic device 101 may measure a distance and an angle of the external device 102 using the UWB and provide a command for controlling a sound of the external device 102 to the external device. When a user (speaker) voice is generated in a left channel of the external device 102 in accordance with the distance and the angle of the external device 102, the electronic device 101 may block the output of a sound from the left channel of the external device 102, or when the user voice is generated in a right channel of the external device 102, may provide a command for performing control to block the output of a sound from the right channel.

The echo canceller 1260 may cancel an echo signal on the basis of the input signal (for example, hi+hello) and the dynamically buffered reference signal (for example, hi+d (x)). The echo canceller 1260 may transfer the microphone input signal (for example, hello) from which the echo signal is cancelled to the audio recorder 1270. The audio recorder 1270 may provide the microphone input signal (for example, hello) from which the echo signal is cancelled to the video call app 1210. Although not illustrated, the electronic device 101 may acquire a user image through a camera (not shown) and transfer the user image to the counterpart device 201 together with the microphone input signal from which the echo signal is cancelled.

Figure 13:
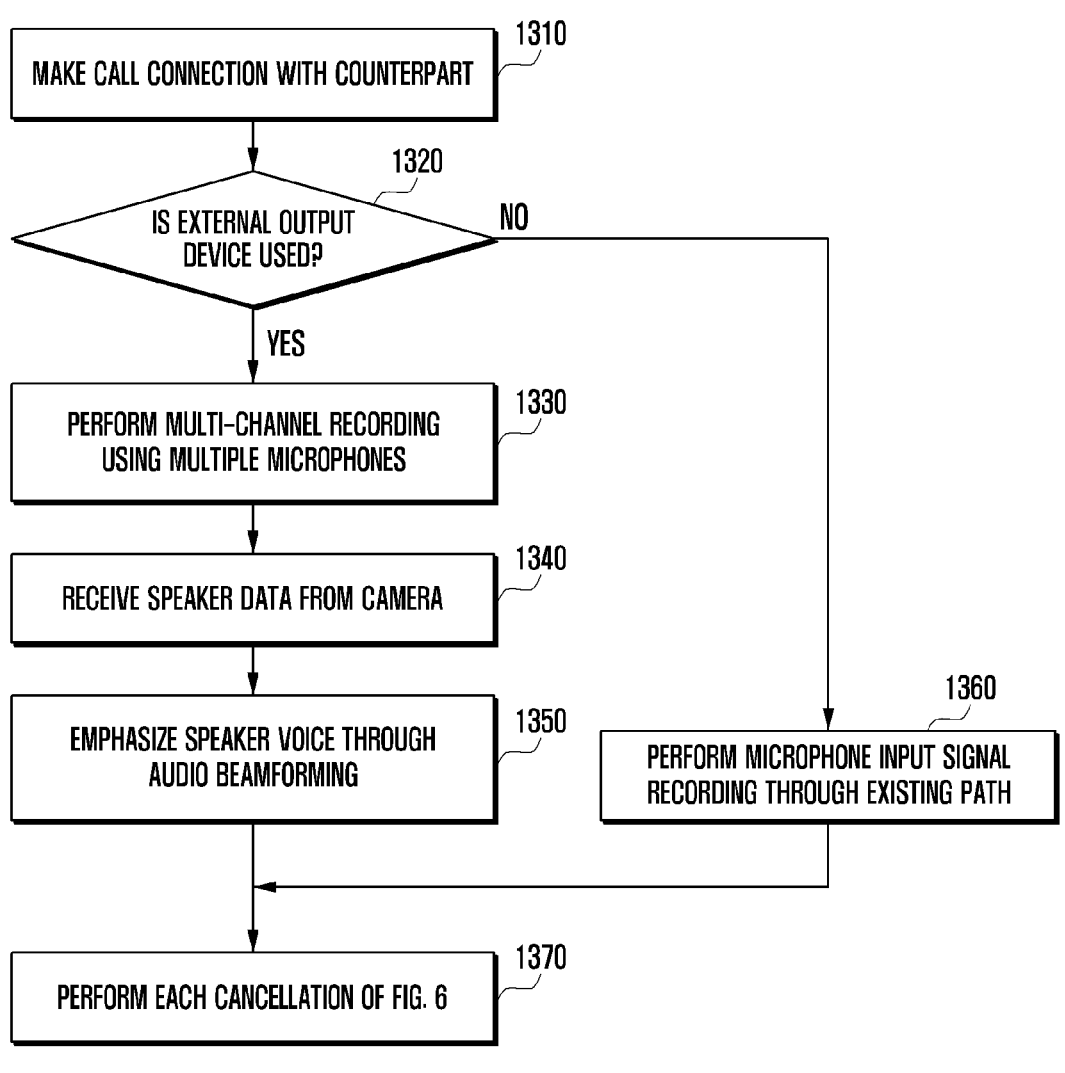
FIG. 13 is a flowchart illustrating an example method by which the electronic device cancels an echo signal flowing therein by the external device according to various embodiments.

FIG. 13 is a flowchart illustrating an example method by which the electronic device cancels an echo signal flowing therein by the external device according to various embodiments.

Referring to FIG. 13, according to an embodiment, a processor (for example, the processor 120 of FIG. 1 or the processor 330 of FIG. 3) of the electronic device 101 may make a call connection with a counterpart device in operation 1310. For example, the electronic device 101 may make the call connection with the counterpart device through a video call application (for example, voice over IP (VoIP)).

In operation 1320, the processor 330 may determine whether to use the external device output on the basis of the call connection with the counterpart.

For example, the processor 330 may output notification information inquiring the user about the use of the external device on the display in response to the call connection with the counterpart device. In response to reception of an acceptance input from the user, the electronic device 101 may proceed to operation 1330 and control to perform multi-channel recording using multiple microphones.

When the user rejects the user of the external device output, the processor 330 may proceed to operation 1360 and record the microphone input signal on the basis of the existing path. For example, the processor 330 may omit speaker beamforming, record sounds collected by the microphone, and transmit the sounds to the counterpart device.

In operation 1340, the processor 330 may receive speaker data from the camera. The processor 330 may analyze an image acquired by the camera, identify a speaker, and provide the identified speaker data to the audio beamforming module.

In operation 1350, the processor 330 may perform audio beamforming for the sounds recorded by multiple channels and emphasize the speaker voice. The processor 330 may perform audio beamforming in the speaker direction identified by the camera, amplify the microphone signal corresponding to the input speaker voice, emphasize the voice signal, and provide the voice signal to the echo canceller.

In operation 1370, the processor 330 may perform the echo cancellation operation of FIG. 6 and transfer the microphone input signal from which echo is cancelled to the counterpart device.

Figure 14:
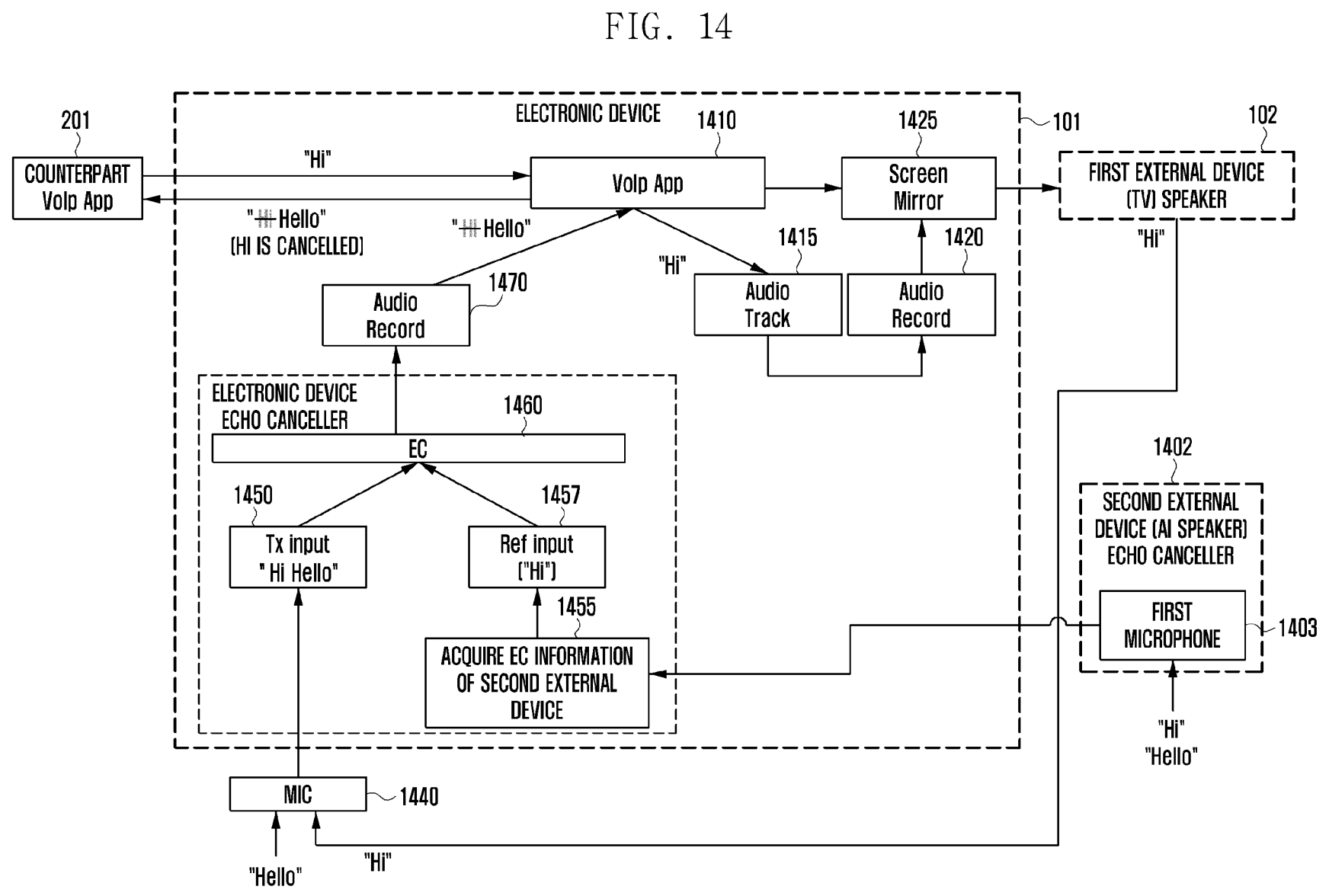

FIG. 14 is a diagram illustrating example configurations of the echo cancellation operation of the electronic device according to various embodiments.

Referring to FIG. 14, according to an embodiment, the electronic device 101 may receive a reference signal from a second external device 1402 to cancel an echo signal generated by the inflow of a speaker sound of a first external device 1401 while making a call connection with a counterpart device (for example, the counterpart device 201 of FIG. 2) through interworking with an external device (for example, the external device 102 of FIG. 2) and may support a function of cancelling echo on the basis of the reference signal received from the second external device 1402.

The electronic device 101 may transmit and receive data to and from the counterpart device 201 through a video call app 1410 (for example, voice over IP (VoIP)) The video call app 1410 may transfer reception data of the counterpart device 201 to a screen mirroring module 1425 and an audio track 1415.

The audio track 1415 may transmit the audio signal in the reception data to an audio recorder 1420, and the audio recorder 1420 may transfer the audio signal to the first external device 1401 through the screen mirroring module 1425. The first external device 1401 may output the audio signal of the counterpart device transferred from the screen mirroring module 1425 to the speaker. The first external device 1401 may receive an image signal of the counterpart device from the screen mirroring module 1425 and display the counterpart image through the display.

The second external device 1402 may be a voice recognition device (for example, artificial intelligence speaker) connected to the first external device 1401. The second external device 1402 may include a first microphone 1403, and may recognize a user voice command through interworking with the first external device 1401 and control the first external device 1401 in response to the voice command. The second external device 1402 may receive an input of the signal output from the speaker of the first external device 1401 through the first microphone 1403 and generate a reference signal for echo processing of the electronic device 101 on the basis thereof. The second external device 1402 may transfer the reference signal to the electronic device 101.

The echo canceller 1460 of the electronic device 101 may receive the reference signal for echo cancellation from the second external device 1402 as indicated by reference numeral 1455, record the received reference signal (ref input) as indicated by reference numeral 1457, and receive an input of a microphone input signal (for example, hello hi) 1450 acquired from the microphone 1440 as transmission data (Tx input). The echo canceller 1460 may cancel an echo signal on the basis of the microphone input signal and the reference signal transferred from the second external device 1402.

The echo canceller 1460 may transfer the microphone input signal (for example, hello) from which the echo signal is cancelled to the audio recorder 1470. The audio recorder 1470 may provide the microphone input signal (for example, hello) from which the echo signal is cancelled to the video call app 1410. Although not illustrated, the electronic device 101 may acquire a user image through a camera (not shown) and transfer the user image along with a microphone history signal from which the echo signal is cancelled to the counterpart device 201.

Figure 15:
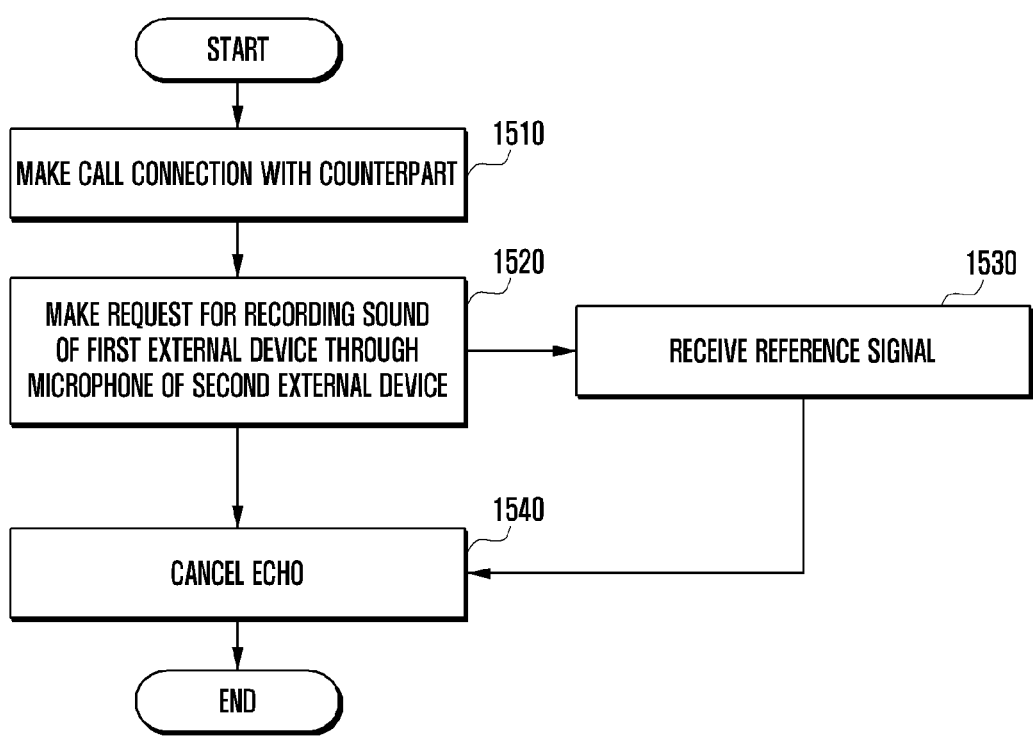
FIG. 15 is a flowchart illustrating an example method by which the electronic device cancels an echo signal flowing therein by the external device according to various embodiments.

FIG. 15 is a flowchart illustrating an example method by which the electronic device cancels an echo signal flowing therein by the external device according to various embodiments.

Referring to FIG. 15, according to an embodiment, a processor (for example, the processor 120 of FIG. 1 or the processor 330 of FIG. 3) of the electronic device 101 may make a call connection with the counterpart device in operation 1510. For example, the electronic device 101 may make the call connection with the counterpart device through a video call application (for example, voice over IP (VoIP)).

In operation 1520, the processor 330 may make a request for recording a sound of the first external device through a microphone of a second external device connected to the first external device.

In operation 1530, the processor 330 may receive a reference signal for echo cancellation from the second external device while acquiring a microphone input signal. In operation 1540, the processor 330 may perform echo cancellation from the microphone input signal on the basis of the reference signal transferred from the second external device and transfer the echo-cancelled signal to the counterpart device.

Figure 16:
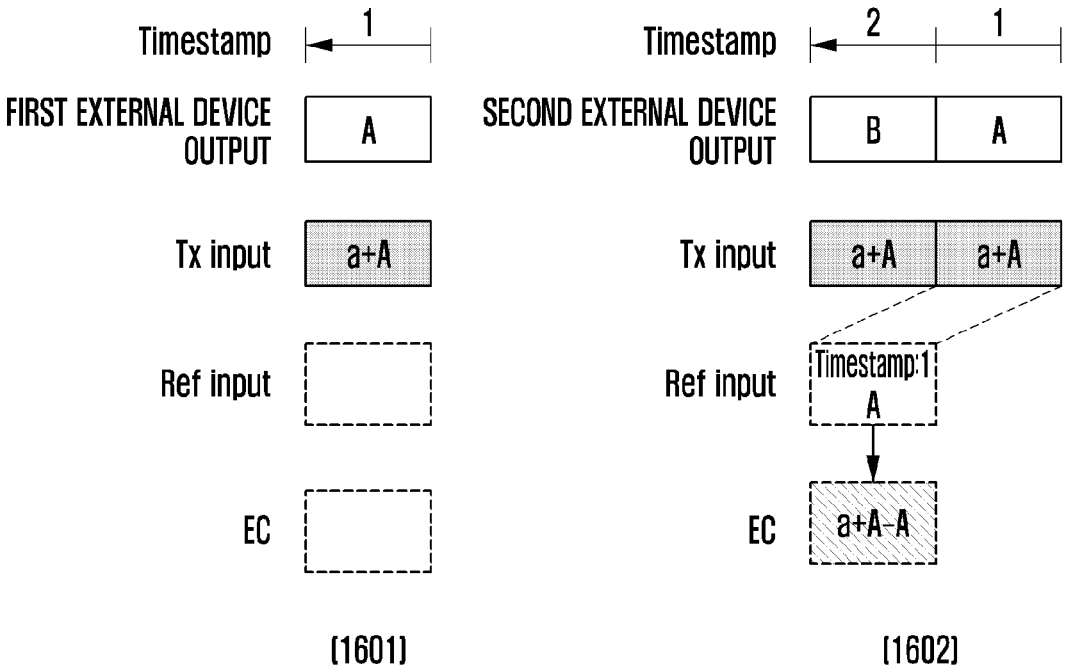
FIG. 16 is a diagram illustrating an example operation in which the electronic device cancels echo by a reference signal of the external device according to various embodiments.

FIG. 16 is a diagram illustrating an example operation in which the electronic device cancels echo by a reference signal of the external device according to various embodiments.

As illustrated in <1601> of FIG. 16, when the electronic device 101 inputs a counterpart audio signal (Rx input) in the order of A and B, the first external device may output a signal A in frame 1 (timestamp 1). The electronic device 101 may record transmission data (Tx input) that is a signal obtained by the speaker sound of the first external device flowing from the microphone. Since the electronic device 101 secures reference data (ref input) from the second external device (for example, the AI speaker) in frame 1, latency is generated until the reference signal reaches the electronic device 101 from the second external device and there is no data in the reference signal, and thus echo cancellation may be postponed.

As illustrated in <1602>, the electronic device 101 may receive a reference signal from the second external device located near the first external device and input data having a matching timestamp as reference data during echo cancellation, thereby cancelling the echo signal included in the microphone input signal.

Figure 17:
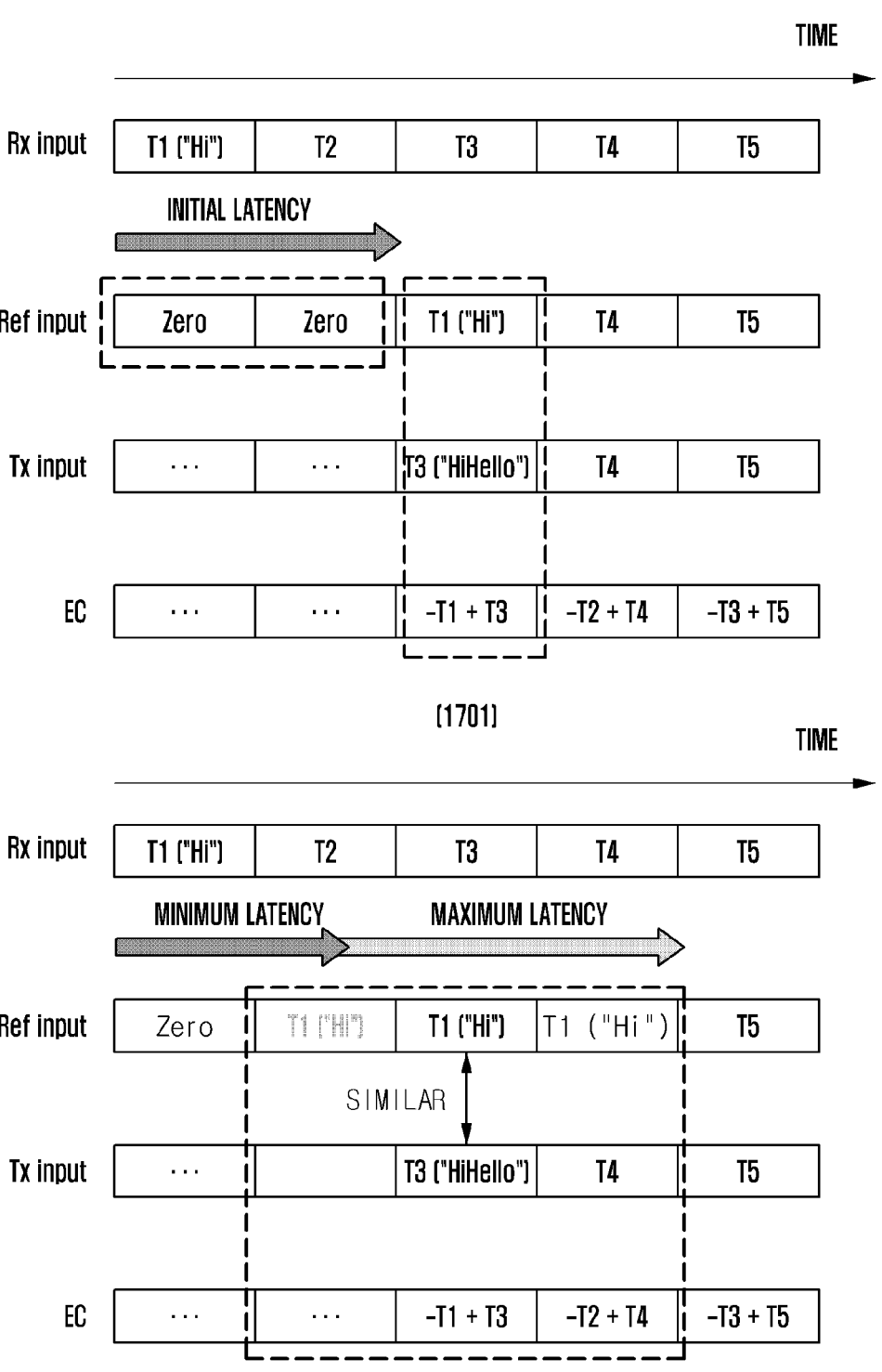
FIG. 17 is a diagram illustrating an example echo cancellation operation through dynamic buffering processing according to various embodiments.

FIG. 17 is a diagram illustrating an example echo cancellation operation through dynamic buffering processing according to various embodiments.

Referring to FIG. 17, when making a call connection with a counterpart device through interworking with an external device, the electronic device according to an embodiment may support a function of processing dynamic buffering by measuring minimum latency and maximum latency within an available range in which a call can be made.

As illustrated in <1701>, the electronic device may measure latency with the external device in the state in which the electronic device is connected to the external device and store initial latency. For example, when initial latency is 2, the electronic device may perform dynamic buffering for a counterpart audio signal (Rx input), delay the reference signal (ref input) by 2, and record the delayed reference signal. The electronic device 101 may perform dynamic buffering for reception data, and when inputting the reference signal, may copy and record zero data before latency and copy reference data and cancel the echo signal (EC) from the transmission signal (Tx input) after latency.

Latency is flexibly changed according to a communication state and a user location, and thus the electronic device 101 may reflect a communication distance on the basis of the measured initial latency as illustrated in <1702>, measure minimum latency and maximum latency, and copy and record all reference signals in the dynamic buffer between minimum latency and maximum latency. The electronic device 101 may analyze machine learning or correlation to check similarity between a reference signal frame and a transmission signal (Tx input) frame and cancel the echo signal on the basis of the most similar frame.

According to various example embodiments, a method of cancelling echo flowing into an electronic device by an external device may include: making a connection with an external device through a screen sharing function and switching a call audio signal path to an external device output path in response to a call connection with a counterpart device, copying a call audio signal (Rx in) transferred to the counterpart device, providing a first signal to an echo cancellation module, and providing a second signal to the external device through the external device output path, measuring latency between the external device and the electronic device, reflecting the measured latency to variably adjust a size of a dynamic buffer for echo cancellation, generating a reference signal delayed from the first signal using the adjusted dynamic buffer, and cancelling an echo signal for the second signal generated by a speaker of the external device from a microphone input signal acquired from at least one microphone, based on the generated reference signal.

According to various example embodiments, the switching to the external device output path may include switching the call audio signal path to the external device output path in response to a condition of activating a speakerphone function and accepting the use of an external output device according to the connection with the counterpart device.

According to various example embodiments, the providing the second signal to the external device may include executing a screen sharing module, based on acceptance of the external output device and providing the second signal to the external device through the screen sharing module.

According to various example embodiments, the measuring the latency may include performing measurement through at least one of an audio profiling scheme of, based on specific audio data moving, calculating latency by analyzing log information indicating a point of each layer at which the specific audio data is checked, an inaudible frequency scheme of calculating latency through the output of an inaudible frequency, and a UWB scheme of calculating latency through an ultra-wideband (UWB) signal.

According to various example embodiments, the variably adjusting the size of the dynamic buffer may include increasing the size of the dynamic buffer in case that the measured latency is larger than latency applied to the dynamic buffer.

According to various example embodiments, the generating the reference signal may include recording zero data in the increased dynamic buffer to generate the reference signal based on there being no data to be recorded in the reference signal before the latency is measured.

According to various example embodiments, the variably adjusting the size of the dynamic buffer may include decreasing the size of the dynamic buffer based on the measured latency being smaller than latency applied to the dynamic buffer.

According to various example embodiments, the generating the reference signal may include generating the reference signal by dropping a part of the first signal by the decreased size of the dynamic buffer in response to the decrease in the size of the dynamic buffer.

According to various example embodiments, the measuring the latency may further include measuring initial latency with the external device, measuring minimum latency and maximum latency, based on the initial latency and a communication distance, and copying all of zero data or a reference signal to a dynamic buffer located between the minimum latency and the maximum latency, and the cancelling the echo signal may include analyzing a similarity between a frame of the reference signal and a frame of the microphone input signal and cancelling the echo signal from the microphone input signal, based on the most similar frame.

According to various example embodiments, the cancelling the echo signal may further include identifying a speaker through a camera and an operation of beamforming a microphone input in a direction in which the speaker is located among respective microphone inputs to amplify a speaker voice, and an echo signal may be cancelled from the microphone input signal in which the speaker voice is amplified.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication module comprising communication circuitry;
at least one microphone;
a processor including processing circuitry; and
memory storing instructions
wherein the instructions, when executed by the processor, cause the electronic device to:
make a connection with an external output device through the communication module;
switch a call audio signal path to an external device output path in response to a call connection with a counterpart device;
provide, to an echo cancellation module of the processor, a first signal which is a copy of a call audio signal received from the counterpart device;
provide to the external output device through the external device output path, a second signal which is another copy of the call audio signal;
obtain, through the at least one microphone, an echo signal corresponding to the second signal and which is output from a speaker of the external output device;
measure a latency between the echo signal and the first signal provided by the echo cancellation module;
adjust a size of a dynamic buffer for echo cancellation processing based on the measured latency;
generate a reference signal by delaying the first signal by the adjusted size of the dynamic buffer; and
remove the echo signal from a microphone input signal obtained from the at least one microphone based on the generated reference signal.

2. The electronic device of claim 1, wherein the instructions, when executed by the processor, cause the electronic device to switch the call audio signal path to the external device output path in response to a condition of activating a speakerphone function and accepting the use of an external output device according to the connection with the counterpart device.

3. The electronic device of claim 1, wherein the instructions, when executed by the processor, cause the electronic device to execute a screen sharing module, based on acceptance of the use of the external output device and provide the second signal to the screen sharing module, and
wherein the screen sharing module is configured to support a screen mirroring function of providing at least one of image data and audio data to the external device connected to the electronic device.

4. The electronic device of claim 1, wherein the instructions, when executed by the processor, cause the electronic device to measure latency through at least one of an audio profiling scheme of calculating latency by analyzing log information indicating a point of each layer at which specific audio data is checked based on the specific audio data moving, an inaudible frequency scheme of calculating latency through an inaudible frequency output, and an ultra-wideband (UWB) scheme of calculating latency through a UWB signal.

5. The electronic device of claim 1, wherein the instructions, when executed by the processor, cause the electronic device to:
increase the size of the dynamic buffer based on the measured latency being larger than latency applied to the dynamic buffer; and decrease the size of the dynamic buffer based on the measured latency being smaller than latency applied to the dynamic buffer.

6. The electronic device of claim 5, wherein the instructions, when executed by the processor, cause the electronic device to record zero data in the increased dynamic buffer to generate the reference signal based on there being no data to be recorded in the reference signal before the latency is measured.

7. The electronic device of claim 5, wherein the instructions, when executed by the processor, cause the electronic device to generate the reference signal by dropping a part of the first signal by the decreased size of the dynamic buffer in response to the decrease in the size of the dynamic buffer.

8. The electronic device of claim 1, further comprising a camera,
wherein the microphone comprises a plurality of microphone arrays, and
wherein the instructions, when executed by the processor, cause the electronic device to:
receive speaker identification information through the camera; and
beamform and amplify a microphone input in a direction in which a speaker is located among respective microphone inputs and cancel an echo signal for the first signal generated by the speaker of the external device from the amplified microphone input signal.

9. A method of cancelling echo flowing into an electronic device by an external device, the method comprising:
making a connection with an external output device through a screen sharing function;
switching a call audio signal path to an external device output path in response to a call connection with a counterpart device;
providing, to an echo cancellation module of a processor, a first signal which is a copy of a call audio signal received from the counterpart device;
providing to the external output device through the external device output path, a second signal which is another copy of the call audio signal;
obtaining, through at least one microphone of the electronic device, an echo signal corresponding to the second signal and which is output from a speaker of the external output device;
measuring latency between the external device and the electronic device;
adjusting a size of a dynamic buffer for each cancellation processing based on the measured latency;
generating a reference signal delayed from the first signal using the adjusted dynamic buffer; and
cancelling an echo signal for the second signal generated by a speaker of the external device from a microphone input signal acquired from at least one microphone, based on the generated reference signal.

10. The method of claim 9, wherein the switching to the external device output path comprises switching the call audio signal path to the external device output path in response to a condition of activating a speakerphone function and accepting the use of an external output device according to the connection with the counterpart device, and
wherein the providing of the second signal to the external device comprises executing a screen sharing module, based on acceptance of the external output device and providing the second signal to the external device through the screen sharing module.

11. The method of claim 10, wherein the adjusting the size of the dynamic buffer comprises increasing the size of the dynamic buffer based on the measured latency being larger than latency applied to the dynamic buffer and decreasing the size of the dynamic buffer based on the measured latency being smaller than latency applied to the dynamic buffer.

12. The method of claim 11, wherein the generating of the reference signal comprises recording zero data in the increased dynamic buffer to generate the reference signal based on there being no data to be recorded in the reference signal before the latency is measured.

13. The method of claim 9, wherein the measuring of the latency comprises performing measurement through at least one of an audio profiling scheme of calculating latency by analyzing log information indicating a point of each layer at which specific audio data is checked based on the specific audio data moving, an inaudible frequency scheme of calculating latency through an inaudible frequency output, and an ultra-wideband (UWB) scheme of calculating latency through a UWB signal.

\* \* \* \* \*